United States Patent
Nakano

(10) Patent No.: US 10,571,840 B2
(45) Date of Patent: Feb. 25, 2020

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Toshimitsu Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/249,095

(22) Filed: Jan. 16, 2019

(65) Prior Publication Data

US 2019/0227470 A1 Jul. 25, 2019

(30) Foreign Application Priority Data

Jan. 25, 2018 (JP) .................................. 2018-010634

(51) Int. Cl.
*G03G 15/00* (2006.01)
*H04N 1/00* (2006.01)

(52) U.S. Cl.
CPC ......... *G03G 15/50* (2013.01); *G03G 15/5058* (2013.01); *G03G 15/5062* (2013.01); *H04N 1/00* (2013.01)

(58) Field of Classification Search
CPC .............. G03G 15/50; G03G 15/5058; G03G 15/5062; H04N 1/00; H04N 1/405; H04N 1/4055; H04N 1/407
See application file for complete search history.

(56) References Cited

U.S. PATENT DOCUMENTS

2016/0309056 A1* 10/2016 Wakui .................... H04N 1/405
2017/0208211 A1* 7/2017 Nakano ............... H04N 1/4055

FOREIGN PATENT DOCUMENTS

JP 11-98357 4/1999
JP 2009-232455 10/2009

* cited by examiner

*Primary Examiner* — Sophia S Chen

(74) *Attorney, Agent, or Firm* — Venable LLP

(57) ABSTRACT

The image processing apparatus measures a density of a first test chart printed using first pattern data obtained by binarizing multi-value patch pattern data with a first resolution, converts the first pattern data into second pattern data with a second resolution, and measures a density of a second test chart printed using the second pattern data. The apparatus obtains difference correction data for correcting differences between the densities of the first and second test charts, corrects the density of the multi-value patch pattern data with the first resolution based on the difference correction data, and generates test chart data including a first pattern obtained by converting pattern data obtained by binarizing the corrected multi-value patch pattern data into pattern data with the second resolution and a second pattern obtained by binarizing multi-value patch pattern data with the second resolution.

11 Claims, 22 Drawing Sheets

FIG. 5A

|   | A | B | C | D | E | F | G | H | I | J | K | L | M | N | O | P |
|---|---|---|---|---|---|---|---|---|---|---|---|---|---|---|---|---|
| 0 | 104 | 48 | 56 | 112 | 143 | 199 | 191 | 135 | 105 | 50 | 58 | 114 | 145 | 201 | 193 | 137 |
| 1 | 40 | 0 | 8 | 64 | 207 | 247 | 239 | 183 | 42 | 2 | 10 | 55 | 209 | 249 | 241 | 185 |
| 2 | 32 | 24 | 16 | 72 | 215 | 223 | 231 | 175 | 34 | 25 | 18 | 74 | 217 | 225 | 233 | 177 |
| 3 | 96 | 88 | 80 | 120 | 151 | 159 | 167 | 127 | 98 | 90 | 82 | 122 | 153 | 161 | 169 | 129 |
| 4 | 147 | 203 | 195 | 139 | 108 | 52 | 60 | 116 | 149 | 205 | 197 | 141 | 110 | 54 | 62 | 118 |
| 5 | 211 | 251 | 243 | 187 | 44 | 4 | 12 | 68 | 213 | 253 | 245 | 189 | 45 | 6 | 14 | 70 |
| 6 | 219 | 227 | 235 | 179 | 35 | 28 | 20 | 76 | 221 | 229 | 237 | 181 | 33 | 30 | 22 | 78 |
| 7 | 155 | 163 | 171 | 131 | 100 | 92 | 84 | 124 | 157 | 165 | 173 | 133 | 102 | 94 | 85 | 125 |
| 8 | 107 | 51 | 59 | 115 | 145 | 202 | 194 | 138 | 105 | 49 | 57 | 113 | 144 | 200 | 192 | 135 |
| 9 | 43 | 3 | 11 | 67 | 210 | 250 | 242 | 186 | 41 | 1 | 9 | 65 | 208 | 248 | 240 | 184 |
| 10 | 35 | 27 | 19 | 75 | 218 | 225 | 234 | 178 | 33 | 25 | 17 | 73 | 216 | 224 | 232 | 176 |
| 11 | 99 | 91 | 83 | 123 | 154 | 162 | 170 | 130 | 97 | 89 | 81 | 121 | 152 | 160 | 168 | 128 |
| 12 | 150 | 205 | 193 | 142 | 111 | 55 | 63 | 119 | 148 | 204 | 195 | 140 | 109 | 53 | 61 | 117 |
| 13 | 214 | 254 | 245 | 190 | 47 | 7 | 15 | 71 | 212 | 252 | 244 | 188 | 45 | 5 | 13 | 69 |
| 14 | 222 | 230 | 233 | 182 | 39 | 31 | 23 | 79 | 220 | 228 | 235 | 180 | 37 | 29 | 21 | 77 |
| 15 | 158 | 165 | 174 | 134 | 103 | 95 | 87 | 127 | 156 | 164 | 172 | 132 | 101 | 93 | 85 | 125 |

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 0 | 0 | 0 | 0 | 0 | 0 | 0 | 0 | 0 | 0 |
| 0 | 0 | 140 | 140 | 140 | 140 | 0 | 0 | 0 | 0 | 0 | 0 | 0 | 0 | 0 | 0 |
| 0 | 0 | 140 | 140 | 140 | 140 | 0 | 0 | 0 | 0 | 0 | 0 | 0 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 0 | 0 | 0 | 0 | 0 | 0 | 0 | 0 | 0 | 0 |
| 0 | 0 | 140 | 140 | 140 | 140 | 0 | 0 | 0 | 0 | 0 | 0 | 0 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 140 | 140 | 140 | 140 | 140 | 140 | 140 | 140 | 140 | 140 | 140 | 0 | 0 | 0 |
| 0 | 0 | 0 | 0 | 0 | 0 | 0 | 0 | 0 | 0 | 0 | 0 | 0 | 0 | 0 | 0 |

502

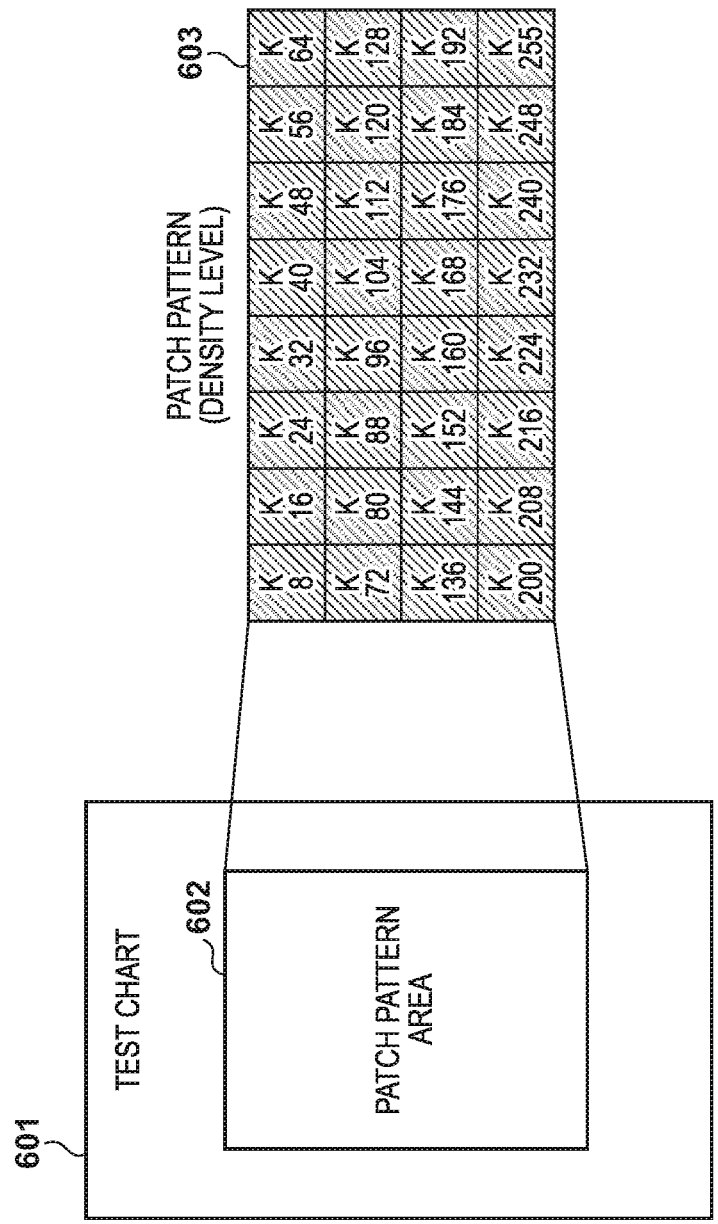

FIG. 9

PATCH PATTERN GENERATION PROCESSING

↓

GENERATE MULTI-VALUE BITMAP WITH RESOLUTION OF 1200 dpi — S901

↓

BINARIZE BY HALFTONE PROCESSING WITH RESOLUTION OF 1200 dpi — S902

↓

HOLD BINARY BITMAP DATA WITH RESOLUTION OF 1200 dpi — S903

↓

END

FIG. 10A

|   | A | B | C | D | E | F | G | H | I | J | K | L | M | N | O | P |
|---|---|---|---|---|---|---|---|---|---|---|---|---|---|---|---|---|
| 0 | 153 | 129 | 108 | 95 | 94 | 104 | 120 | 149 | 167 | 145 | 126 | 114 | 112 | 118 | 141 | 163 |
| 1 | 124 | 88 | 55 | 52 | 50 | 60 | 85 | 116 | 161 | 181 | 189 | 197 | 199 | 193 | 185 | 173 |
| 2 | 100 | 58 | 34 | 24 | 22 | 32 | 56 | 92 | 139 | 195 | 217 | 229 | 231 | 225 | 203 | 159 |
| 3 | 84 | 44 | 18 | 6 | 4 | 16 | 42 | 76 | 131 | 205 | 235 | 245 | 247 | 237 | 219 | 143 |
| 4 | 80 | 40 | 14 | 2 | 0 | 12 | 35 | 72 | 122 | 209 | 239 | 251 | 253 | 249 | 213 | 137 |
| 5 | 90 | 54 | 26 | 10 | 8 | 20 | 45 | 82 | 135 | 201 | 227 | 241 | 243 | 233 | 207 | 147 |
| 6 | 110 | 70 | 48 | 30 | 28 | 38 | 68 | 102 | 151 | 187 | 211 | 221 | 223 | 215 | 191 | 169 |
| 7 | 133 | 105 | 78 | 54 | 52 | 74 | 98 | 127 | 165 | 179 | 171 | 157 | 155 | 175 | 183 | 177 |
| 8 | 168 | 145 | 127 | 115 | 113 | 119 | 142 | 164 | 154 | 130 | 109 | 97 | 95 | 105 | 121 | 150 |
| 9 | 162 | 182 | 190 | 198 | 200 | 194 | 185 | 174 | 125 | 89 | 67 | 53 | 51 | 61 | 87 | 117 |
| 10 | 140 | 195 | 218 | 230 | 232 | 225 | 204 | 160 | 101 | 59 | 35 | 25 | 23 | 33 | 57 | 93 |
| 11 | 132 | 205 | 235 | 246 | 248 | 233 | 220 | 144 | 85 | 45 | 19 | 7 | 5 | 17 | 43 | 77 |
| 12 | 123 | 210 | 240 | 252 | 254 | 250 | 214 | 133 | 81 | 41 | 15 | 3 | 1 | 13 | 37 | 73 |
| 13 | 135 | 202 | 228 | 242 | 244 | 234 | 203 | 143 | 91 | 55 | 27 | 11 | 9 | 21 | 47 | 83 |
| 14 | 152 | 188 | 212 | 222 | 224 | 216 | 192 | 170 | 111 | 71 | 49 | 31 | 29 | 39 | 69 | 103 |
| 15 | 166 | 180 | 172 | 158 | 156 | 176 | 184 | 178 | 134 | 107 | 79 | 65 | 63 | 75 | 99 | 128 |

| | A | B | C | D | E | F | G | H | I | J | K | L | M | N | O | P |
|---|---|---|---|---|---|---|---|---|---|---|---|---|---|---|---|---|
| 0 | 104 | 48 | 56 | 112 | 143 | 199 | 191 | 135 | 105 | 50 | 58 | 114 | 145 | 201 | 193 | 137 |
| 1 | 40 | 0 | 8 | 64 | 207 | 247 | 239 | 183 | 42 | 2 | 10 | 55 | 209 | 249 | 241 | 185 |
| 2 | 32 | 24 | 16 | 72 | 215 | 223 | 231 | 175 | 34 | 25 | 18 | 74 | 217 | 225 | 233 | 177 |
| 3 | 96 | 88 | 80 | 120 | 151 | 159 | 167 | 127 | 98 | 90 | 82 | 122 | 153 | 161 | 169 | 129 |
| 4 | 147 | 203 | 195 | 139 | 108 | 52 | 60 | 116 | 149 | 205 | 197 | 141 | 110 | 54 | 62 | 118 |
| 5 | 211 | 251 | 243 | 187 | 44 | 4 | 12 | 68 | 213 | 253 | 245 | 189 | 45 | 6 | 14 | 70 |
| 6 | 219 | 227 | 235 | 179 | 35 | 28 | 20 | 76 | 221 | 229 | 237 | 181 | 33 | 30 | 22 | 78 |
| 7 | 155 | 163 | 171 | 131 | 100 | 92 | 84 | 124 | 157 | 165 | 173 | 133 | 102 | 94 | 85 | 125 |
| 8 | 107 | 51 | 59 | 115 | 145 | 202 | 194 | 138 | 105 | 49 | 57 | 113 | 144 | 200 | 192 | 135 |
| 9 | 43 | 3 | 11 | 67 | 210 | 250 | 242 | 186 | 41 | 1 | 9 | 65 | 208 | 248 | 240 | 184 |
| 10 | 35 | 27 | 19 | 75 | 218 | 225 | 234 | 178 | 33 | 25 | 17 | 73 | 216 | 224 | 232 | 176 |
| 11 | 99 | 91 | 83 | 123 | 154 | 162 | 170 | 130 | 97 | 89 | 81 | 121 | 152 | 160 | 168 | 128 |
| 12 | 150 | 205 | 193 | 142 | 111 | 55 | 63 | 119 | 148 | 204 | 195 | 140 | 109 | 53 | 61 | 117 |
| 13 | 214 | 254 | 245 | 190 | 47 | 7 | 15 | 71 | 212 | 252 | 244 | 188 | 45 | 5 | 13 | 69 |
| 14 | 222 | 230 | 233 | 182 | 39 | 31 | 23 | 79 | 220 | 228 | 235 | 180 | 37 | 29 | 21 | 77 |
| 15 | 158 | 165 | 174 | 134 | 103 | 95 | 87 | 127 | 156 | 164 | 172 | 132 | 101 | 93 | 85 | 125 |

1201

1202

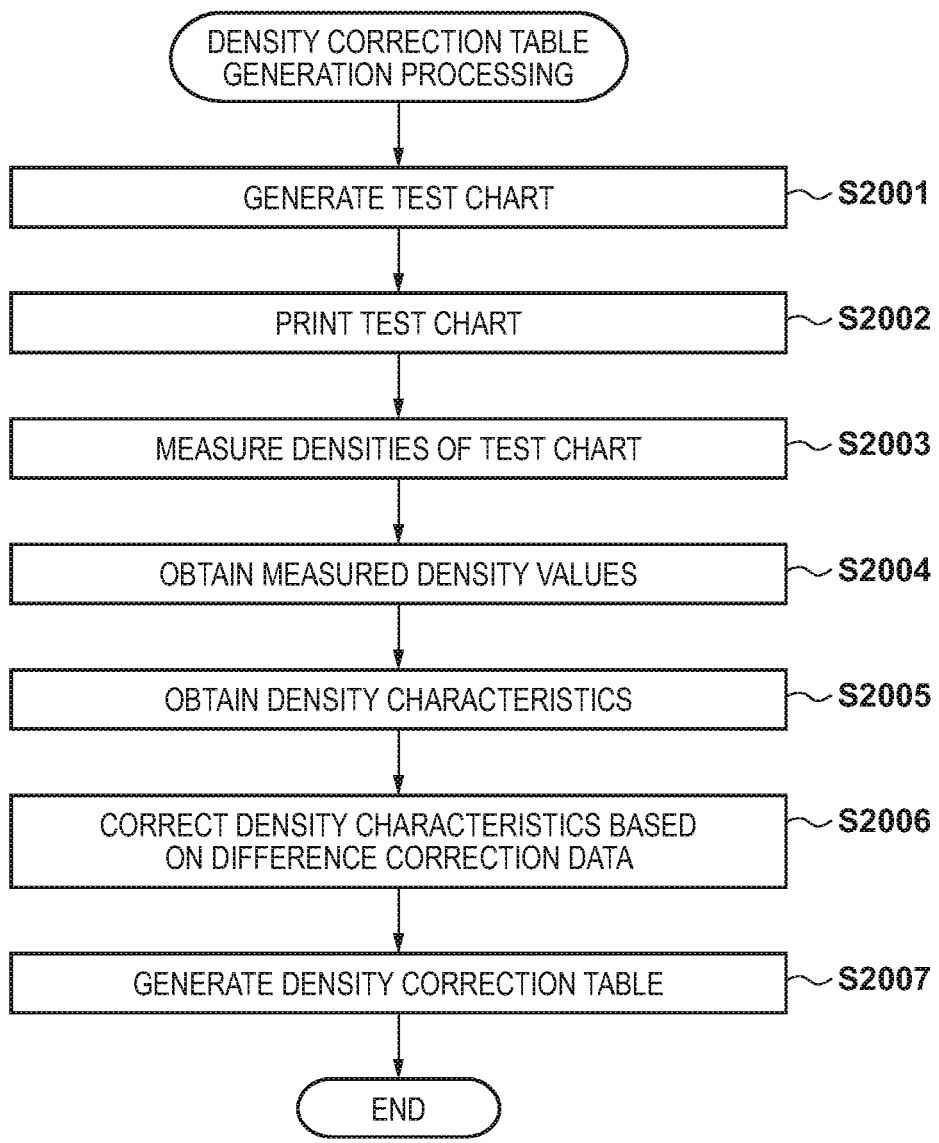

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, image forming apparatuses that adopt an electrophotographic method form an image by exposing a photosensitive drum with a laser beam modulated according to an image signal, or the like so as to form a latent image, developing the latent image using toner, which is a charged color material, and transferring and fixing the developed toner image onto a sheet. In each pixel, such image forming apparatuses form an image at low gradation, and thus halftone processing for expressing gradation using binary pixels is adopted for multi-value image data that expresses multi-gradation in each pixel, in order to reproduce the halftone of image data in a stable manner with fidelity. Dithering and an error-diffusion method are used in this halftone processing. In dithering, a threshold value table called dither matrix is used, and pixel values of image data and corresponding threshold values of the dither matrix are compared. By setting target pixels to a value indicating a laser beam being on (light-on) or a value indicating a laser beam being off (light-out) based on this comparison, a pattern of dots is formed so as to express gradation.

In addition, such image forming apparatuses perform density adjustment in order to express ideal gradation. In this density adjustment, halftone processing is performed on image data (patch) that has not undergone density adjustment and is composed of a plurality of different pixel values, and a test chart constituted by patch patterns of dots is generated. The generated test chart is then printed, and the densities of the patches of the printed test chart are measured. Subsequently, the density characteristics for the current pixel value are calculated from the measured density values, and a density correction table for converting input pixel values into pixel values that are indicated by the current density characteristics, which are target densities for the input pixel values, is generated from the calculated density characteristics. Density adjustment is then performed by converting the input pixel values using the density correction table (for example, see Japanese Patent Laid-Open No. H11-98357).

Such density adjustment is required to be performed on all the pixels that have undergone halftone processing, and pixels with a resolution at which output is performed. Therefore, the test chart is printed for each resolution and a density correction table is generated, or a density correction table for a resolution is calculated from a density correction table of halftone processing for other similar density characteristics, through approximation. This is described in Japanese Patent Laid-Open No. 2009-232455, for example.

In the above-described density adjustment, it is necessary to print a test chart and to generate a density correction table, for each resolution at which the printing apparatus performs printing. Therefore, in the case of an image forming apparatus that has a printing mode for a plurality of resolutions, it is necessary to perform an operation of printing a number of test charts corresponding to the number of the resolutions, and generating density correction tables.

In addition, in a case of calculating a density correction table for a resolution, through approximation, from a density correction table for halftone processing for other similar density characteristics, density correction tables corresponding to a plurality of resolutions can be generated from one test chart. However, if the density characteristics of the image forming apparatus change due to an environment or temporal change, there is an issue that an error of density characteristics for different resolutions in the density correction table generated in this manner increases, and the accuracy of the density correction table decreases.

SUMMARY OF THE INVENTION

An aspect of the present invention is to eliminate the above-mentioned problem with conventional technology.

The feature of the present invention is to provide a technique for performing density adjustment while saving the trouble for printing a test chart for each resolution.

According to a first aspect of the present invention, there is provided an image processing apparatus comprising: a printer; a memory device that stores a set of instructions; and at least one processor that executes the instructions stored in the memory to: cause a scanner to read a first test chart printed by the printer using first pattern data obtained by binarizing multi-value patch pattern data with a first resolution, and measure a density of the first test chart, convert the first pattern data into second pattern data with a second resolution different from the first resolution, cause the scanner to read a second test chart printed by the printer using the second pattern data with the second resolution, and measure a density of the second test chart, obtain difference correction data for correcting differences between the density of the first test chart and the density of the second test chart, correct the density of the multi-value patch pattern data with the first resolution based on the difference correction data, and generate test chart data including a first pattern obtained by converting pattern data obtained by binarizing the corrected multi-value patch pattern data with the first resolution into pattern data with the second resolution and a second pattern obtained by binarizing multi-value patch pattern data with the second resolution.

According to a second aspect of the present invention, there is provided a method of controlling an image processing apparatus having a printer, the method comprising: measuring a density of a first test chart printed by the printer using first pattern data obtained by binarizing multi-value patch pattern data with a first resolution; converting the first pattern data into second pattern data with a second resolution different from the first resolution; measuring a density of a second test chart printed by the printer using the second pattern data with the second resolution after conversion; obtaining difference correction data for correcting differences between the density of the first test chart and the density of the second test chart; correcting the density of the multi-value patch pattern data with the first resolution based on the difference correction data; and generating test chart data including a first pattern obtained by converting pattern data obtained by binarizing the corrected multi-value patch pattern data with the first resolution into pattern data with the second resolution and a second pattern obtained by binarizing multi-value patch pattern data with the second resolution.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a diagram showing an example of a dither matrix of 600 dpi that is used in halftone processing according to the first embodiment.

FIG. 5B is a diagram showing an example of image data in the first embodiment.

FIG. 6 is a diagram showing an example of a test chart for density correction.

FIG. 9 is a flowchart for describing processing for generating a patch pattern with a resolution of 1200 dpi that is performed by the density adjustment processing unit according to the first embodiment.

FIG. 10A is a diagram showing an example of a dither matrix with a resolution 1200 dpi for halftone processing according to the first embodiment.

FIG. 20 is a flowchart for describing processing for generating a density correction table that is performed by a density adjustment processing unit according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. In this embodiment, a multi-function peripheral (MFP) that has a plurality of functions such as a copy function and a printer function will be described below as an example, but the present invention is not limited to such a multifunctional printer.

First Embodiment

In a first embodiment, an image processing apparatus that performs density adjustment processing using the same test chart including patch patterns with different resolutions will be described as an example.

Figure 1:
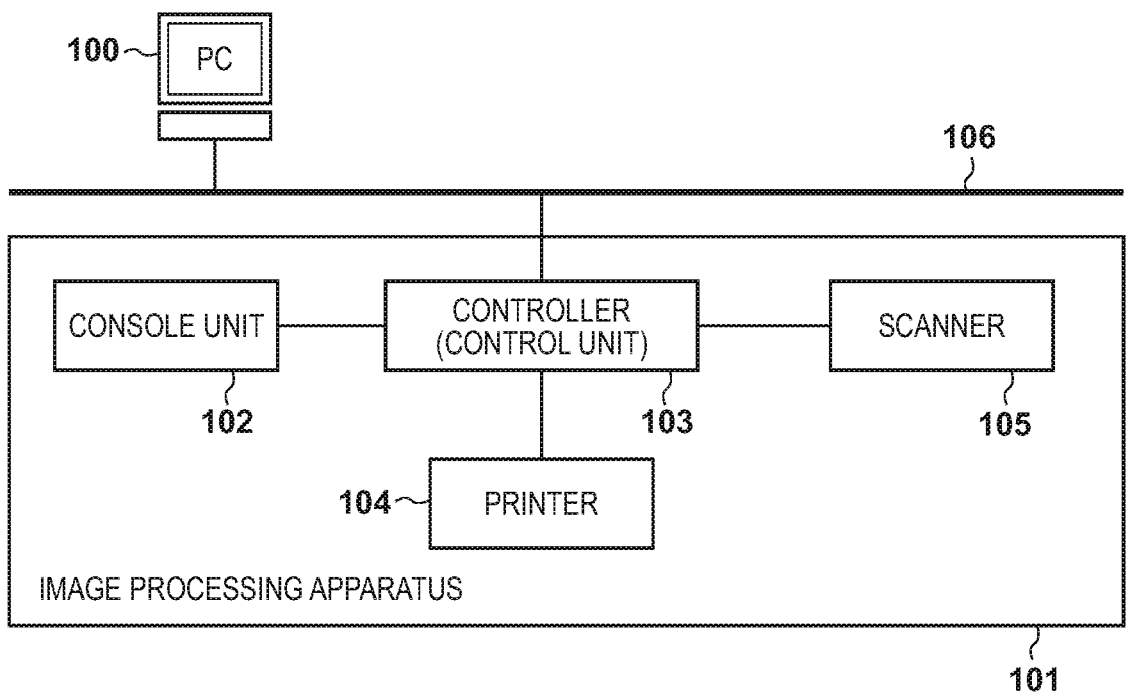
FIG. 1 is a diagram showing the configuration of an image processing system according to a first embodiment of the present invention.

FIG. 1 is a diagram showing the configuration of an image processing system according to the first embodiment of the present invention. In this system, a host computer 100 and an image processing apparatus 101 are connected to a network 106, but the present invention is not limited to this configuration. In addition, in the first embodiment, a network is adopted as a connection method, but the present invention is not limited thereto. For example, a serial transmission method using a USB and the like and a parallel transmission method using Centronics, SCSI, and the like are also applicable.

The host computer (hereinafter, PC) 100 has functions of a general personal computer. This PC 100 can transmit/receive a file via the network 106. Furthermore, the PC 100 can also transmit print data (print job) to the image processing apparatus 101 via a printer driver.

The image processing apparatus 101 has a printer 104, a controller (control unit) 103 that controls overall operation of the image processing apparatus 101, and a console unit 102 that includes a plurality of keys for allowing a user to make an instruction, and a display unit that displays various types of information that need to be notified to the user. Note that this display unit may have a touch panel function. Furthermore, the image processing apparatus 101 has a scanner 105 that reads a document, and generates image data corresponding to the image of the document.

Figure 2:
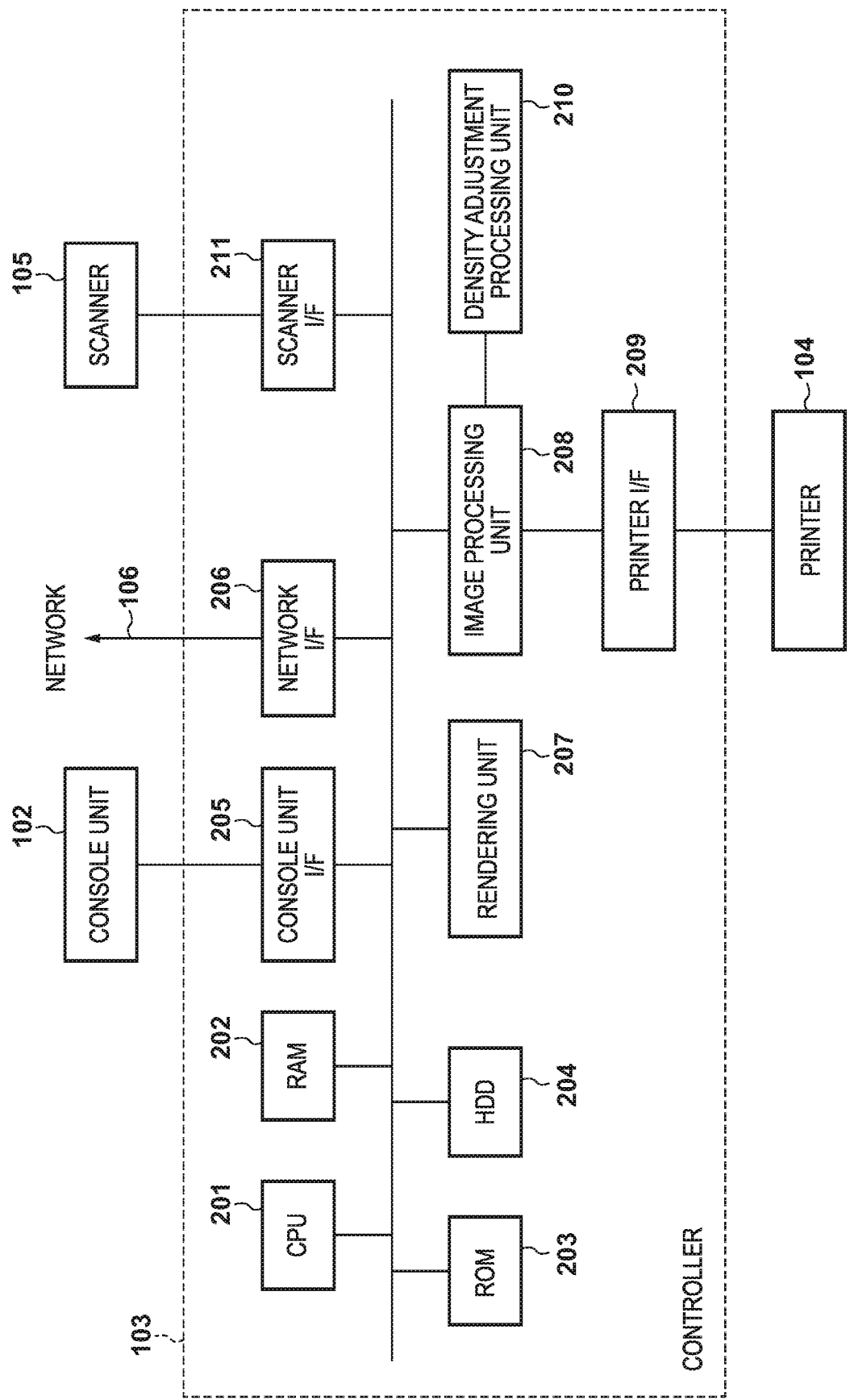
FIG. 2 is a block diagram for describing the configuration of a controller of the image processing apparatus according to the first embodiment.

FIG. 2 is a block diagram for describing the configuration of the controller 103 of the image processing apparatus 101 according to the first embodiment.

The controller 103 is connected to the PC 100, an external image processing apparatus, and the like via the network 106. This enables input/output of print data and device information. A CPU 201 executes a boot program stored in a ROM 203, deploys a control program stored in an HDD 204 into a RAM 202, executes the deployed program, and thereby integrally controls access to various devices. Furthermore, the CPU 201 also integrally controls various types of processing such as image processing that is performed by the controller 103. The RAM 202 is a system work memory for allowing the CPU 201 to operate, and is also a memory for temporarily storing image data such as print data and bitmap data. This RAM 202 comprises an SRAM that can hold the content thereof even when the apparatus is turned off and a DRAM in which the stored data is erased by the power supply being shut off. The ROM 203 stores a boot program of the apparatus, various type of setting data, and the like. The HDD 204 is a hard disk drive, and stores system software, image data, and the like.

A console unit I/F 205 is an interface unit for connecting the controller 103 and the console unit 102. This console unit I/F 205 outputs, to the console unit 102, image data to be displayed on the console unit 102, and obtains information that has been input from the console unit 102. A network I/F 206 is connected to the network 106, and transmits/receives setting information such as a printing mode, image data, and print data. A scanner I/F 211 connects the controller 103 and the scanner 105, and inputs image data generated by the scanner 105. A rendering unit 207 receives intermediate data generated based on PDL data that is print data transmitted from the PC 100 or the like, and generates contone (multi-value) bitmap data with the same resolution as the output resolution of the printer 104. A density adjustment processing unit 210 generates a density correction table for correcting pixel values of bitmap data. An image processing unit 208 receives bitmap data generated by the rendering unit 207, references attribute data appended to this bitmap data and setting information, and performs image processing on the bitmap data. The bitmap data that has undergone image processing is output to the printer 104 via a printer I/F 209, with an output resolution that has been set in the printing mode. Note that, in the following description, functions of the rendering unit 207, the image processing unit 208, and the density adjustment processing unit 210 will be described as being realized by the CPU 201 executing programs deployed in the RAM 202. However, these functions may be realized using an ASIC (application specific integrated circuit), for example.

Figure 3:
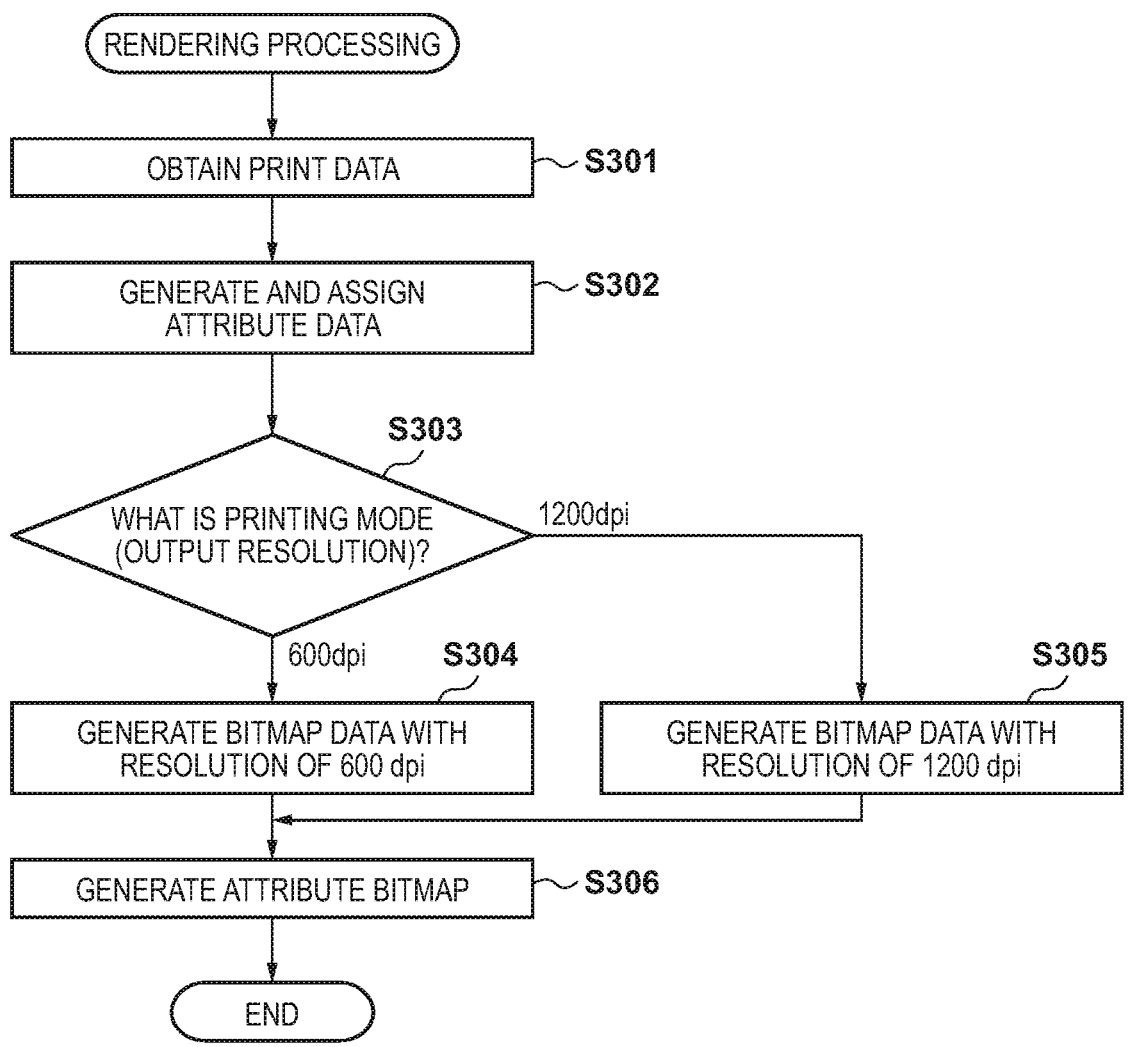
FIG. 3 is a flowchart for describing rendering processing that is performed by a rendering unit according to the first embodiment.

FIG. 3 is a flowchart for describing rendering processing that is processed by the rendering unit 207 according to the first embodiment. Note that, here, the rendering processing will be described as being achieved by the CPU 201 executing a program deployed in the RAM 202.

First, in step S301, the CPU 201 obtains print data transmitted from the PC 100 or the like. Next, the procedure advances to step S302, where the CPU 201 analyzes the print data, determines which of a character, a line, graphics, and an image the attribute of the print data is, generates attribute information based on the determination, and assigns the generated attribute information to the print data. Here, if the print data is information regarding character drawing (command) represented as character type, character code, or the like, a character attribute is assigned, and if the print data is a line drawing command represented as coordinate points, length, and thickness, a line attribute is assigned. In addition, if the print data is a graphic drawing command represented as rectangle, shape, and coordinate points, a graphic attribute is assigned, and if the print data is information regarding image drawing represented as bitmap data, an image attribute is assigned. Furthermore, the character attribute is classified into small-sized character and not-small-sized character according to the character size.

Next, the procedure advances to step S303, where the CPU 201 obtains the output resolution in the printing mode of the information regarding the print data, and determines whether the output resolution is 600 dpi or 1200 dpi. In the case of 600 dpi, the procedure advances to step S304, where the CPU 201 forms a pixel pattern with a resolution of 600 dpi, and generates bitmap data that includes color information (contone value) for drawing for the pixels, and the procedure advances to step S306.

On the other hand, if the CPU 201 determines in step S303 that the output resolution of the printing mode is 1200 dpi, the procedure advances to step S305, where the CPU 201 forms a pixel pattern with a resolution 1200 dpi, and generates bitmap data that includes color information (contone value) for drawing for the pixels, and the procedure advances to step S306.

In step S306, the CPU 201 generates an attribute bitmap that stores the attribute determined in step S302 in correspondence with the pixels of the bitmap data, and ends this processing. Note that, the bitmap data for drawing and the attribute bitmap that are generated here are stored in the RAM 202 or the HDD 204, and are sent to the image processing unit 208.

Figure 4:
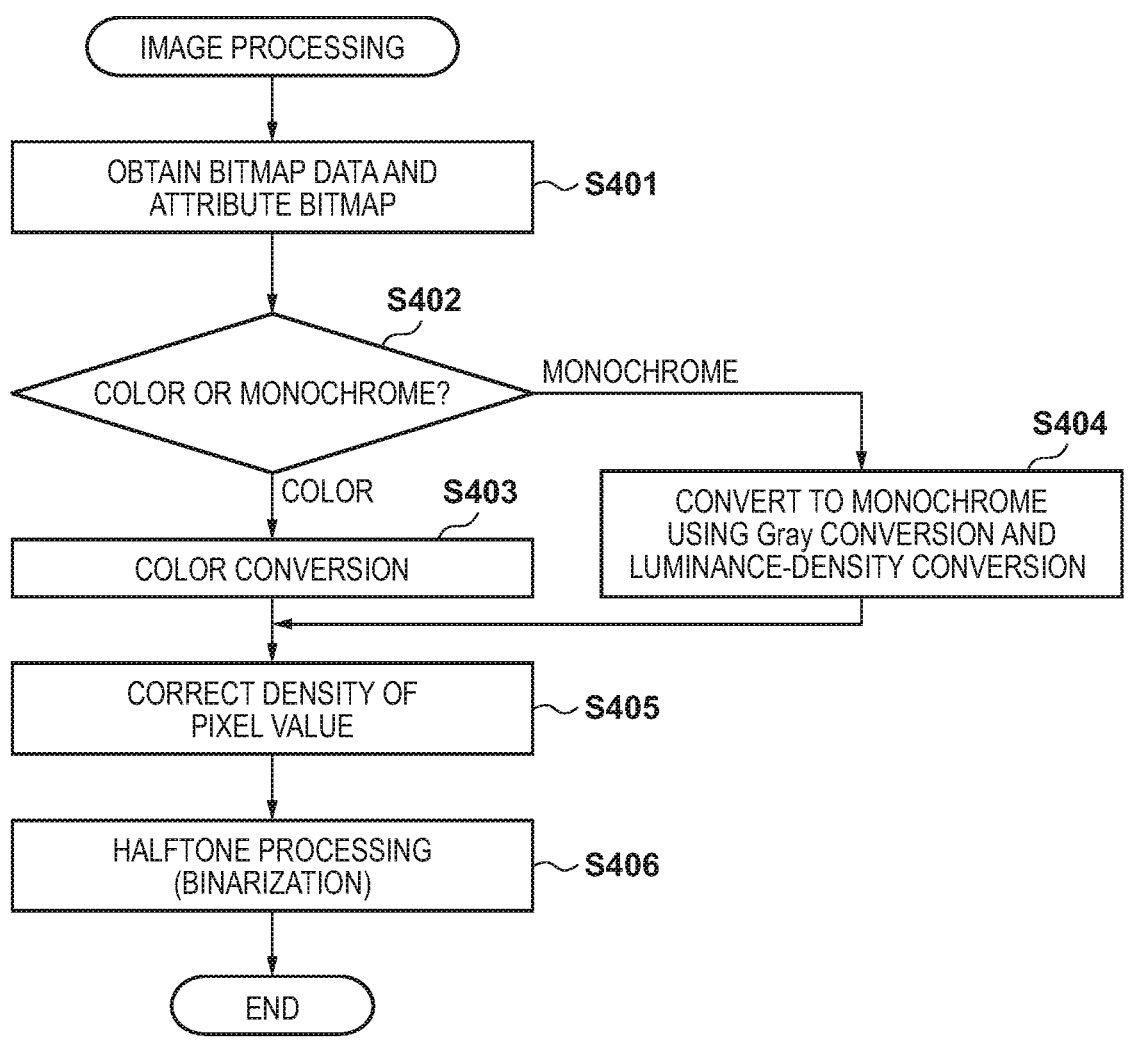
FIG. 4 is a flowchart for describing image processing and binarization processing that are performed by an image processing unit according to the first embodiment.

FIG. 4 is a flowchart for describing image processing and binarization processing that are performed by the image processing unit 208 according to the first embodiment. Note that the processes illustrated in this flowchart will be described as being achieved by the CPU 201 executing a program deployed in the RAM 202.

First, in step S401, the CPU 201 obtains bitmap data of an output resolution and an attribute bitmap generated by the rendering unit 207. Next, the procedure advances to step S402, where the CPU 201 determines whether output is performed in colors or in monochrome. If it is determined that output is performed in colors, the procedure advances to step S403, where the CPU 201 converts color information of the pixels of the bitmap data into CMYK colors that are in a color format for color output, using color conversion LUT or matrix calculation, and the procedure advances to step S405.

On the other hand, if it is determined in step S402 that output is performed in monochrome, the procedure advances to step S404, where the CPU 201 converts color information of the pixels of the bitmap data into a value of K (black) of monochrome output, using a Gray conversion equation and a luminance-density conversion equation, and the procedure advances to step S405.

In step S405, the CPU 201 corrects corresponding pixel values of the image data according to the attribute information of the pixels of the attribute bitmap, using a density correction table for colors. Next, the procedure advances to step S406, where the CPU 201 selects a dither matrix according to the attribute information of the pixels of the attribute bitmap, and performs halftone processing on the pixels of the bitmap data through dithering using the selected dither matrix. In this manner, the pixel values (contone values) of the bitmap data are converted into binary values, and binary bitmap data is generated, and this processing ends. Note that, here, the generated binary bitmap data is sent to the printer 104 and is printed.

Next, halftone processing in step S406 will be described in detail with reference to FIGS. 5A to 5C.

FIG. 5A is a diagram showing an example of a dither matrix 501 of 600 dpi that is used in halftone processing according to the first embodiment.

FIG. 5B is a diagram showing an example of image data 502 in the first embodiment.

Figure 5C:
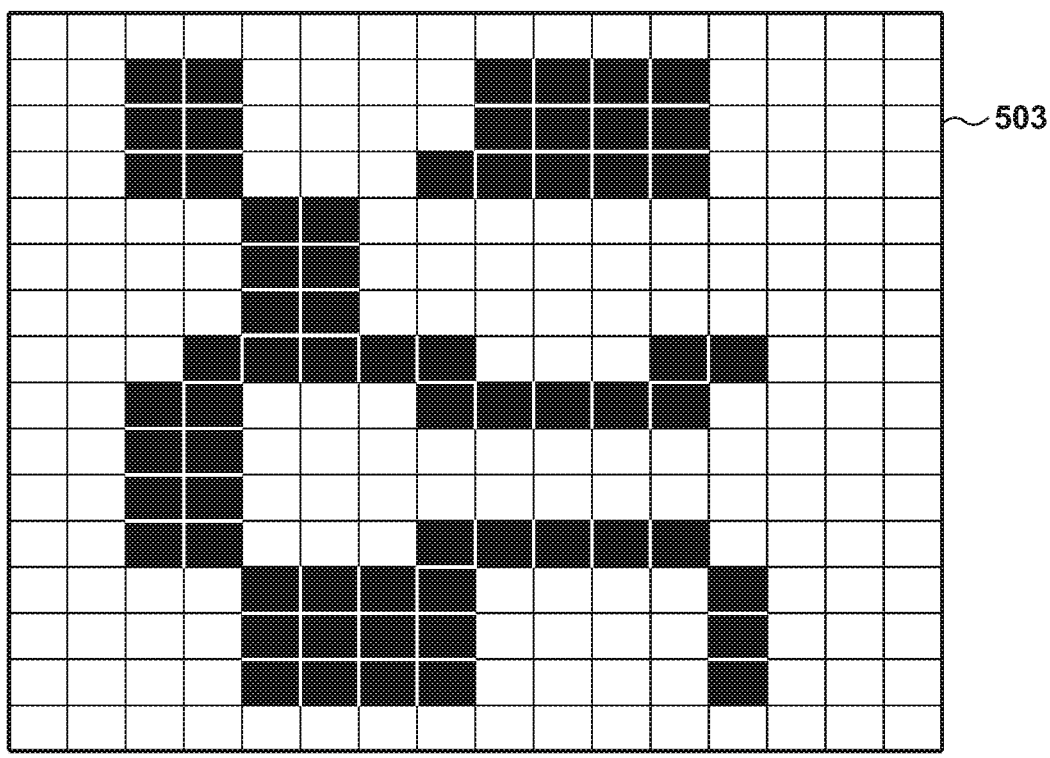
FIG. 5C is a diagram showing an example of binary bitmap data binarized in the first embodiment.

FIG. 5C is a diagram showing an example of binary bitmap data 503 binarized in the first embodiment.

In halftone processing through dithering, image data of corresponding color is received from CMYK or K image data, and threshold values corresponding to the pixel positions of the image data 502 that has been input are read out from the dither matrix 501 in which a plurality of threshold values are arranged. Subsequently, by comparing the pixel values of the image data that has been input with the corresponding threshold values, the pixel values are converted into N values. By performing this halftone processing, image data with continuous gradation that has been input is converted into image data with area gradation constituted by halftone dots.

FIG. 5A shows an example of the general binary dither matrix 501 of 600 dpi, and this binary dither matrix 501 is constituted by one matrix. FIG. 5B shows the image data 502 constituted by graphics data of the pixel value "140" of K with a resolution of 600 dpi and blank data of the pixel value "0".

In the halftone processing in the first embodiment, the pixel values of the pixels of this image data 502 are converted into two-gradation binary data having the value 0 (white) or 1 (black). In addition, the dither matrix 501 is repeatedly arranged to match the image data, using, as a start point, a reference position (a position A0 in FIG. 5A) of the image data 502.

One threshold value is read out from the position in the dither matrix 501 corresponding to the position of each pixel of the image data 502, and the threshold value is compared with the value of the pixel of the image data 502. If the value of the pixel is larger than or equal to the threshold value, "1" is output, and otherwise "0" is output, thereby performing binarization. Binary bitmap data obtained in this manner is represented as bitmap data 503 in FIG. 5C. In FIG. 5C, pixels shown in black represent pixels that have the value "1".

Note that, in the first embodiment, dither matrixes different for respective CMYK color planes may be used.

Next, a method for generating a density correction table that is performed by the density adjustment processing unit 210 according to the first embodiment will be described with reference to FIGS. 6 and 7.

FIG. 6 is a diagram showing an example of a test chart for density correction.

A test chart 601 has a patch pattern area 602. In this patch pattern area 602, halftone processing is performed on a halftone pattern (patch) in which the density of "255" (solid black of black 100%) to "0" (corresponding to white) of an input pixel value is divided by 32 with a difference of density of 8 (predetermined amount). The test chart is constituted by a patch pattern 603 of binary bitmap data obtained in this manner. The range of the values of the density of input pixel includes 0 (white) to 255 (100% solid black). It is possible to provide a plurality of such patch pattern areas 602 according to the type of halftone processing.

Note that, in the first embodiment, a density of each patch is set between 0 (white) and 255 (black) in units of 8, but the units in which density characteristics can be calculated and the number of patches are not limited thereto. Generation of a test chart will be described later in detail.

The test chart is printed onto paper in accordance with a command from the PC 100 or a test printing function of the image processing apparatus 101.

Figure 7:
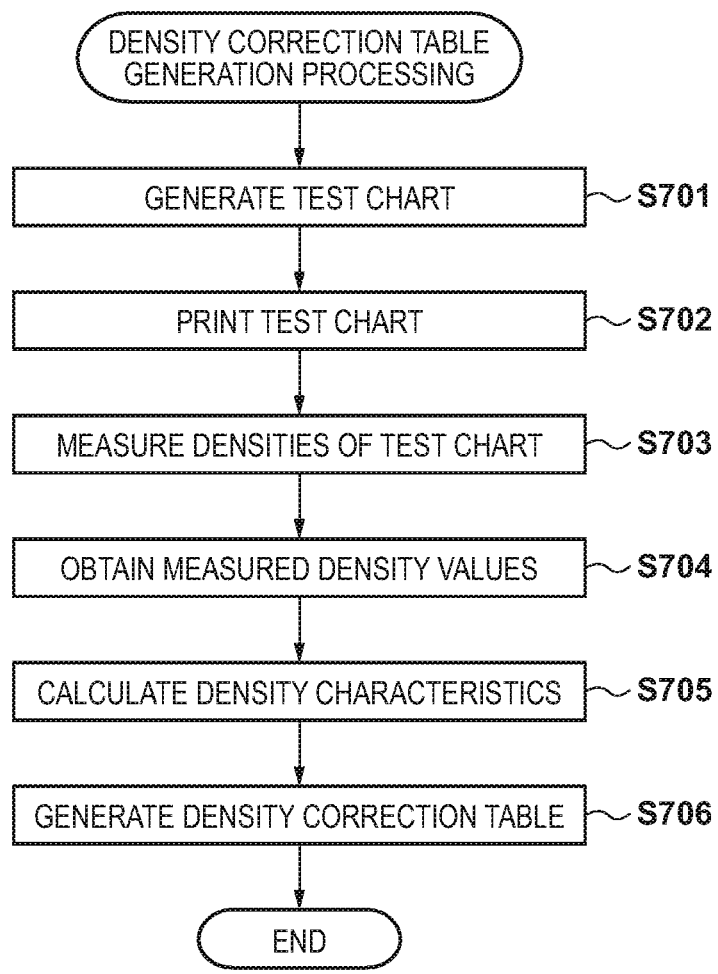
FIG. 7 is a flowchart for describing processing for generating a density correction table that is performed by a density adjustment processing unit according to the first embodiment.

FIG. 7 is a flowchart for describing processing for generating a density correction table that is performed by the density adjustment processing unit 210 according to the first embodiment. Note that, the processing illustrated in this flowchart will be described as being achieved by the CPU 201 executing a program deployed in the RAM 202.

First, in step S701, the CPU 201 generates the test chart 601 for density correction shown in FIG. 6. The procedure then advances to step S702, where the CPU 201 causes the printer 104 to print the generated test chart 601. Next, the procedure advances to step S703, where the CPU 201 causes the scanner 105 to read the printed test chart, and measures the density of the chart. Next, the procedure advances to step S704, where the CPU 201 obtains the measured density value, and advances the procedure to step S705. In step S705, the CPU 201 obtains density characteristics for an input density, from the measured density value.

Figure 8A:
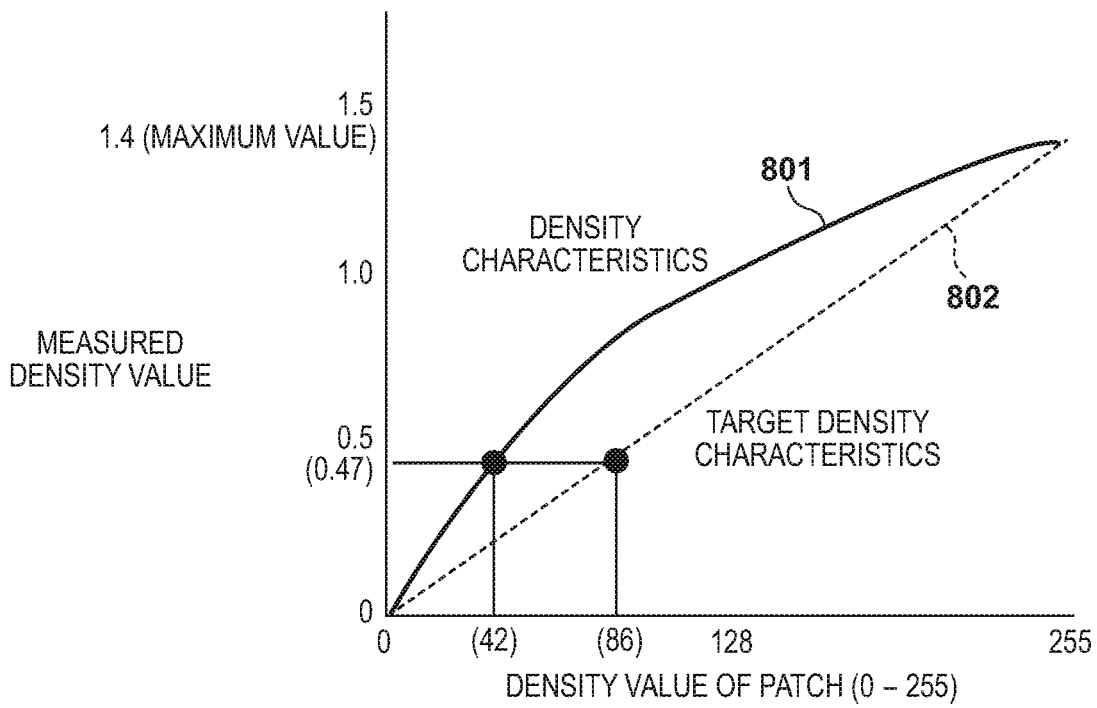
FIG. 8A is a diagram showing an example of density characteristics obtained in step S705.

Here, for example, reference numeral 801 in FIG. 8A denotes an example of density characteristics obtained in step S705. Here, the obtained density characteristics 801 are density characteristics higher than target density characteristics 802. In view of this, as shown in FIG. 8B, a one-dimensional density correction table having characteristics as denoted by reference numeral 811 is generated such that the obtained density characteristics 801 match the target density characteristics 802.

Values in this density correction table are obtained as follows. For example, as shown in FIG. 8A, the density value of the target density characteristics 802 for density value "86" of a patch is "0.47". At this time, in the obtained density characteristics 801, density value "0.47" corresponds to a patch density value "42". Therefore, by changing a patch density value "86" into a density value "42" corresponding to the density value "0.47" of the obtained characteristics 801, a measured density value of the patch can be set as a target density value. Such processing is executed on all the density values "0" to "255", and target density values are obtained, thereby generating a density correction table.

Figure 8B:
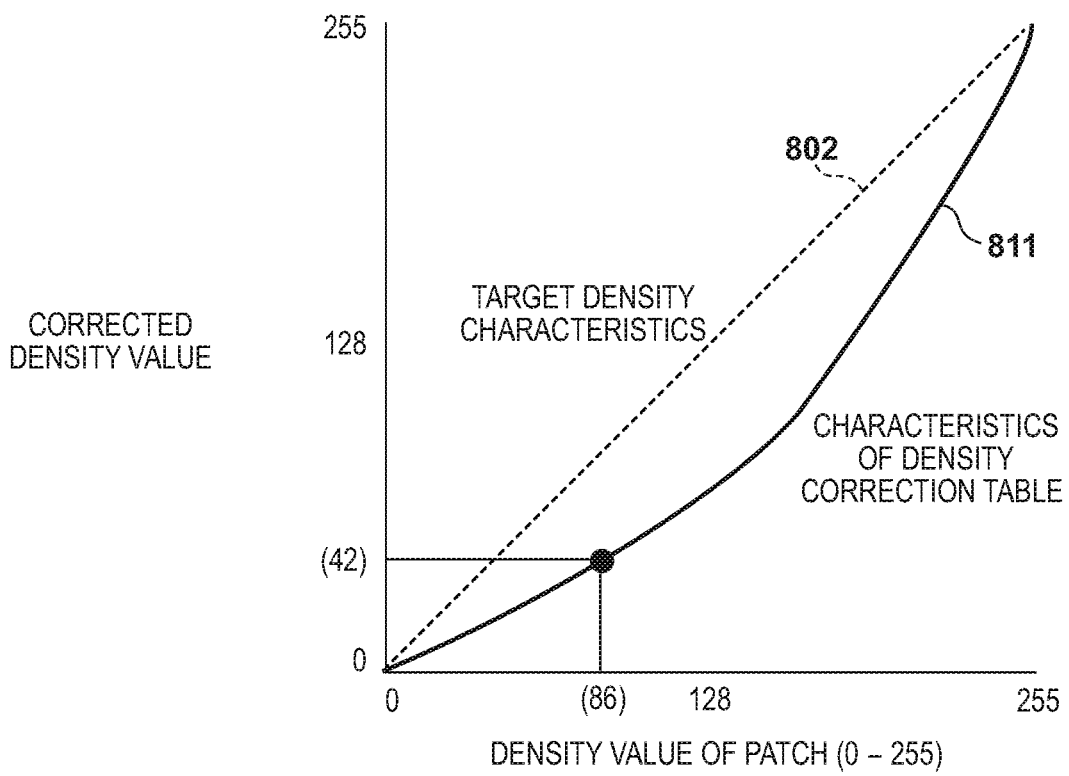
FIG. 8B is a diagram showing the characteristics of a density correction table.

As described above, this density correction table is a table for performing correction such that the obtained density characteristics 801 in FIG. 8A match the target density characteristics 802, and the density correction characteristics of the table are characteristics denoted by reference numeral 811 in FIG. 8B.

Next, processing for generating a test chart according to the first embodiment will be described with reference to FIGS. 9 to 15. This test chart includes a patch pattern group for generating a density correction table for halftone processing when the output resolution is 1200 dpi and a patch pattern group for generating a density correction table of halftone processing when the output resolution is 600 dpi.

FIG. 9 is a flowchart for describing processing for generating a patch pattern of a resolution of 1200 dpi that is performed by the density adjustment processing unit 210 according to the first embodiment. Note that processing illustrated in this flowchart will be described as being achieved by the CPU 201 executing a program deployed in the RAM 202.

First, in step S901, the CPU 201 generates a halftone pattern (patch) in which the density 0 (white) to 255 (solid black) of a pixel value is divided by 32 with a difference of the density 8, and that is represented as the patch pattern 603 in FIG. 6. Here, this halftone pattern (patch) is contone (multi-value) bitmap data represented as 8-bit data with a resolution of "1200 dpi". Next, the procedure advances to step S902, where the CPU 201 performs halftone processing of a resolution 1200 dpi on this multi-value bitmap data, and thereby generates binary bitmap data with the resolution 1200 dpi. The procedure then advances to step S903, where the CPU 201 holds, in the RAM 202, the patch pattern after conversion into the binary bitmap data with the resolution 1200 dpi, and ends this processing.

FIG. 10A is a diagram showing an example of a dither matrix for halftone processing of a resolution 1200 dpi according to the first embodiment.

Figure 10B:
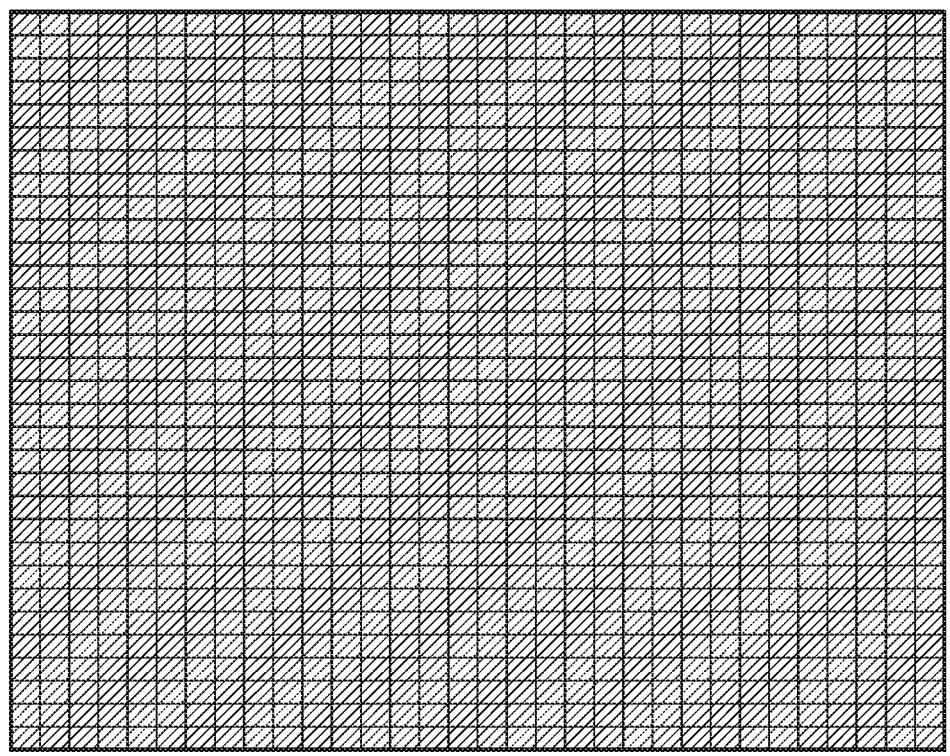
FIG. 10B is a diagram showing an example of multi-value bitmap data with a resolution of 1200 dpi and a density of "100".

FIG. 10B is a diagram showing an example of multi-value bitmap data with a resolution of 1200 dpi and a density of "100".

Figure 10C:
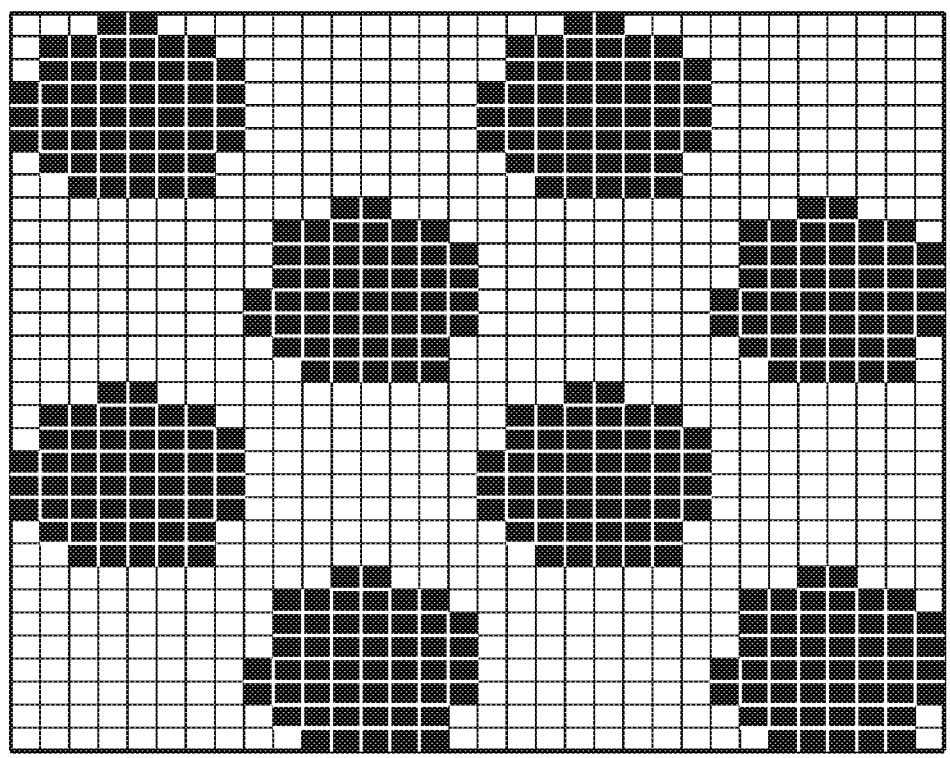
FIG. 10C is a diagram showing an example of binary bitmap data with a resolution of 1200 dpi and a density of "100".

FIG. 10C is a diagram showing an example of binary bitmap data with a resolution of 1200 dpi and a density of "100". Note that, in FIG. 10C, pixels whose binary bitmap data is "1" are shown in black.

When halftone processing is performed on multi-value bitmap data with a resolution of 1200 dpi and a density of "100" in FIG. 10B, using the dither matrix shown in FIG. 10A, binary bitmap data with a resolution 1200 dpi shown in FIG. 10C is obtained.

Figure 11:
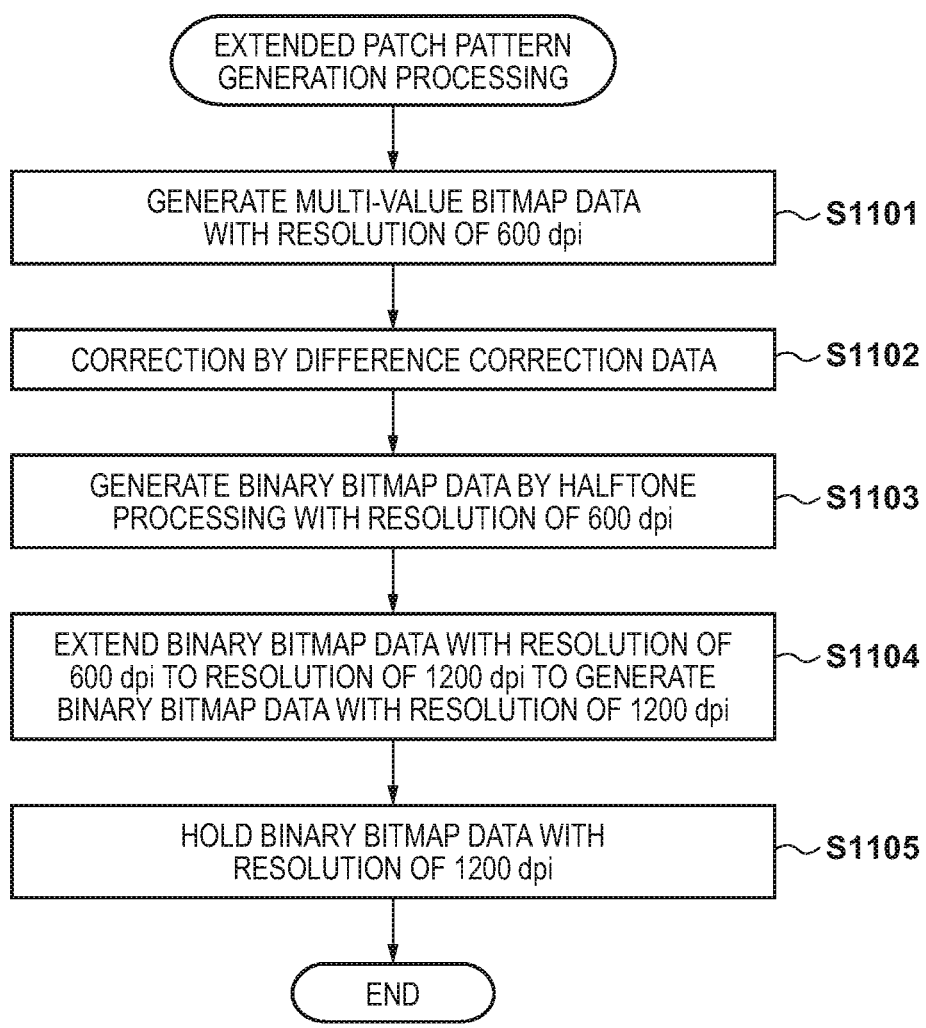
FIG. 11 is a flowchart for describing processing for generating an extended patch pattern that is performed by the density adjustment processing unit according to the first embodiment.

FIG. 11 is a flowchart for describing processing for generating an extended patch pattern that is performed by the density adjustment processing unit 210 according to the first embodiment. Note that processing illustrated in this flowchart will be described as being achieved by the CPU 201 executing a program deployed in the RAM 202.

First, in step S1101, the CPU 201 generates a halftone pattern (patch) in which the density of 0 (white) to 255 (solid black) is divided by 32 with a difference of density "8", and which is represented as the patch pattern 603 in FIG. 6. This halftone pattern (patch) is contone (multi-value) bitmap data represented as 8-bit data with an output resolution of 600 dpi. Next, the procedure advances to step S1102, where the CPU 201 corrects multi-value bitmap data with a resolution of 600 dpi developed in step S1101, using difference correction data of density characteristics for an output resolution 1200 dpi and an output resolution of 600 dpi. Next, the procedure advances to step S1103, where the CPU 201 performs halftone processing of a resolution of 600 dpi on the multi-value bitmap data with a resolution of 600 dpi corrected in step S1102, and thereby generates binary bitmap data with the resolution of 600 dpi. Next, the procedure advances to step S1104, where the CPU 201 extends the binary bitmap data with the resolution of 600 dpi generated in step S1103 to bitmap data with a resolution 1200 dpi. The procedure then advances to step S1105, where the CPU 201 holds, in the RAM 202, the patch pattern of the binary bitmap data extended to a resolution of 1200 dpi, and ends this processing.

Figures 12A, 12B:
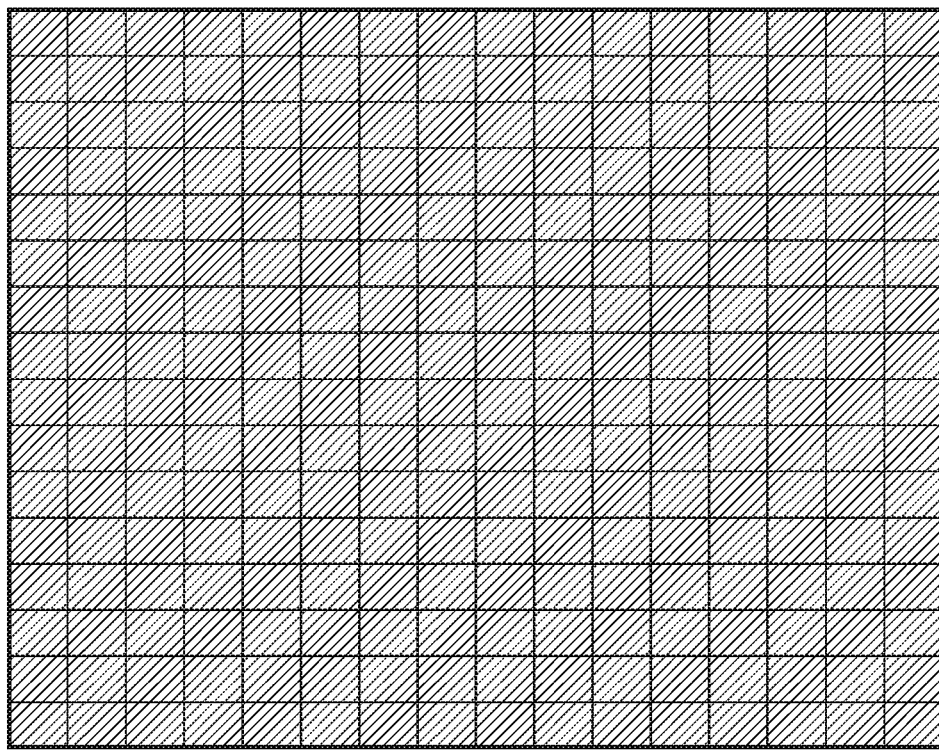
FIG. 12A is a diagram showing an example of a dither matrix with a resolution of 600 dpi for halftone processing.
FIG. 12B is a diagram showing an example of multi-value bitmap data with a resolution of 600 dpi and a corrected density of "110".

FIG. 12A is a diagram showing an example of a dither matrix 1201 for halftone processing of a resolution of 600 dpi.

FIG. 12B is a diagram showing an example of the multi-value bitmap data 1202 with a resolution of 600 dpi and a density of "110" after density correction.

Figure 13A:
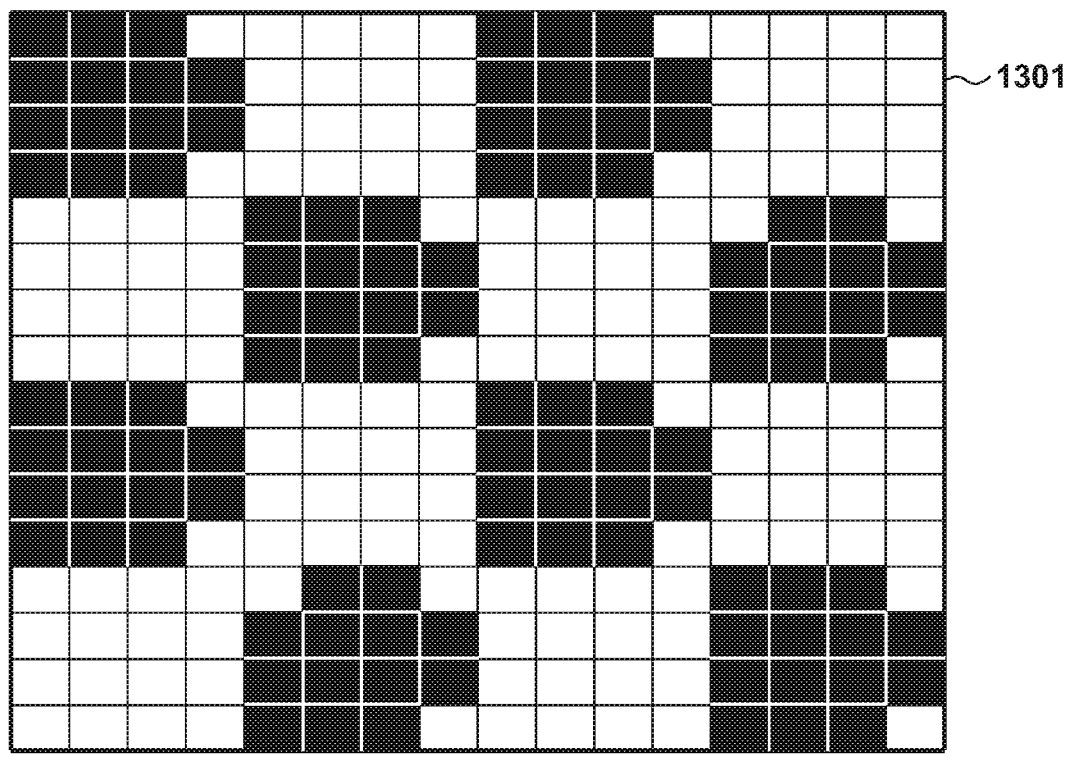
FIG. 13A is a diagram showing an example of binary bitmap data with a resolution of 600 dpi and a density of "110".

FIG. 13A is a diagram showing an example of binary bitmap data 1301 with a density of "110" and a resolution of 600 dpi.

Figure 13B:
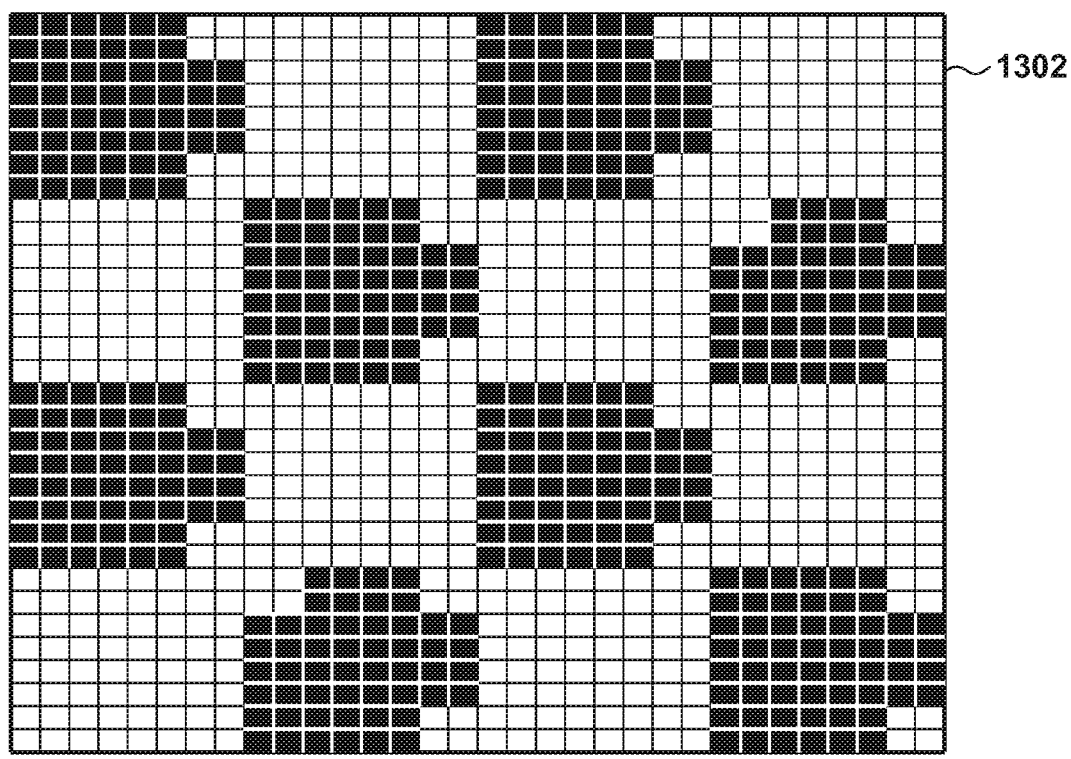
FIG. 13B is a diagram showing an example of binary bitmap data with an extended resolution of 1200 dpi and density of "110".

FIG. 13B is a diagram showing an example of binary bitmap data 1302 with a density of "110" obtained by extending the binary bitmap data in FIG. 13A to a resolution 1200 dpi.

Here, difference correction data is applied to multi-value bitmap data with a resolution of 600 dpi and a density "100", using LUT for correcting the density "100" to "110" based on the difference correction data. Accordingly, for example, multi-value bitmap data with a resolution of 1200 dpi and a density of "100" in FIG. 10B is corrected to multi-value bitmap data 1202 with a resolution 1200 dpi and a density of "110" in FIG. 12B. When halftone processing is performed on this corrected multi-value bitmap data 1202 using the dither matrix 1201 in FIG. 12A, the binary bitmap data 1301 with a resolution of 600 dpi in FIG. 13A is obtained. Furthermore, if each dot in the binary bitmap data 1301 with a resolution of 600 dpi is simply divided by two longitudinally and latitudinally so as to be extended to a resolution of 1200 dpi, the binary bitmap data 1302 extended to a resolution 1200 dpi and shown in FIG. 13B is obtained.

Figure 14:
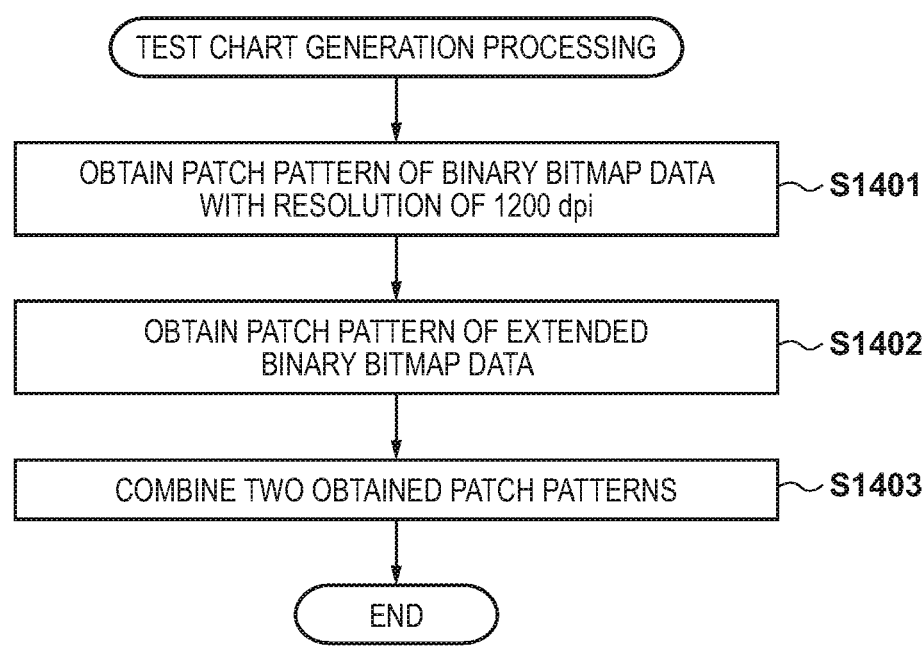
FIG. 14 is a flowchart for describing processing for generating a test chart that is performed by the density adjustment processing unit according to the first embodiment.
Figure 15:
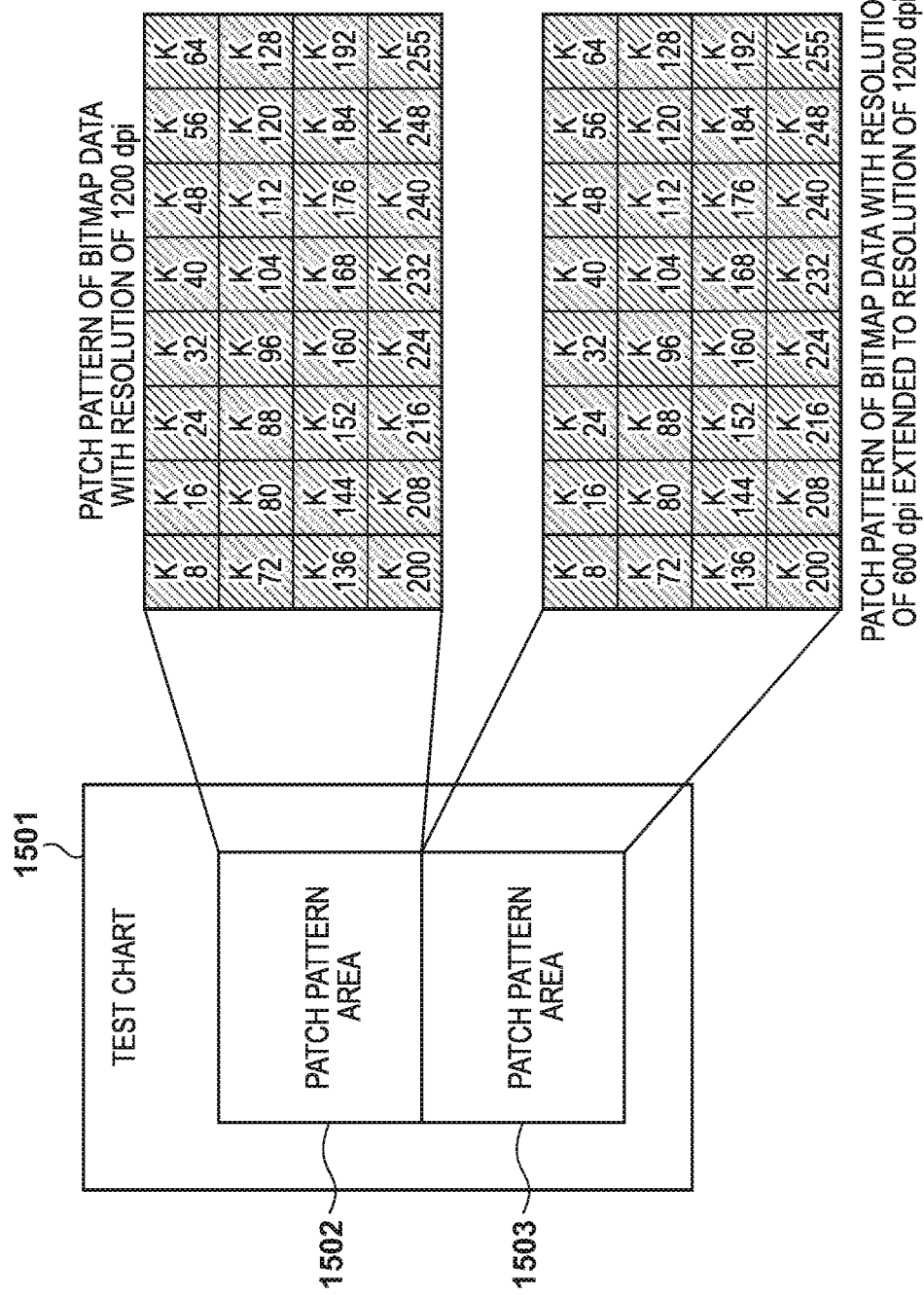
FIG. 15 is a diagram showing an example of a test chart according to the first embodiment.

FIG. 14 is a flowchart for describing processing for generating a test chart that is performed by the density adjustment processing unit 210 according to the first embodiment. Note that processing illustrated in this flowchart will be described as being achieved by the CPU 201 executing a program deployed in the RAM 202. In addition, FIG. 15 is a diagram showing an example of this test chart.

First, in step S1401, the CPU 201 obtains a patch pattern of binary bitmap data with a resolution 1200 dpi generated through the processing for generating a patch pattern with a resolution of 1200 dpi (FIG. 9), and held in the RAM 202. Next, the procedure advances to step S1402, where the CPU 201 obtains a patch pattern of binary bitmap data generated through the processing for generating a patch pattern with a resolution of 600 dpi (FIG. 11), and extended to a resolution of 1200 dpi. The procedure then advances to step S1403, where the CPU 201 arranges the patch pattern of the binary bitmap data with a resolution 1200 dpi obtained in step S1401, in a patch pattern area 1502 in FIG. 15. Furthermore, the CPU 201 arranges, in a patch pattern area 1503, the patch pattern of the binary bitmap data extended to a resolution of 1200 dpi and obtained in step S1402. The two patch patterns obtained in this manner are combined within one page, a test chart 1501 is generated, and this processing ends. Here, both the two patch patterns have a resolution 1200 dpi, and thus can be printed in the same page.

A density correction table that is used as a test chart for density correction is generated by the density adjustment processing unit 210 from the test chart 1501 generated in this manner. Specifically, a density correction table for halftone processing of an output resolution 1200 dpi is generated from measured density values of the patch pattern of the patch pattern area 1502. In addition, a density correction table for halftone processing of an output resolution of 600 dpi is generated from measured density values of the patch pattern of the patch pattern area 1503.

Next, generation of difference correction data will be described.

This difference correction data is obtained as follows. First, the density of a chart when bitmap data that has undergone halftone processing of a resolution of 600 dpi is extended to bitmap data with a resolution 1200 dpi, and is printed with a resolution of 1200 dpi is measured. Density characteristics are then obtained as data for performing correction such that the density characteristics match the density characteristics of a chart when bitmap data that has undergone halftone processing of a resolution of 600 dpi is printed with a resolution of 600 dpi. This difference correction data is used for LUT for correction.

Figure 16:
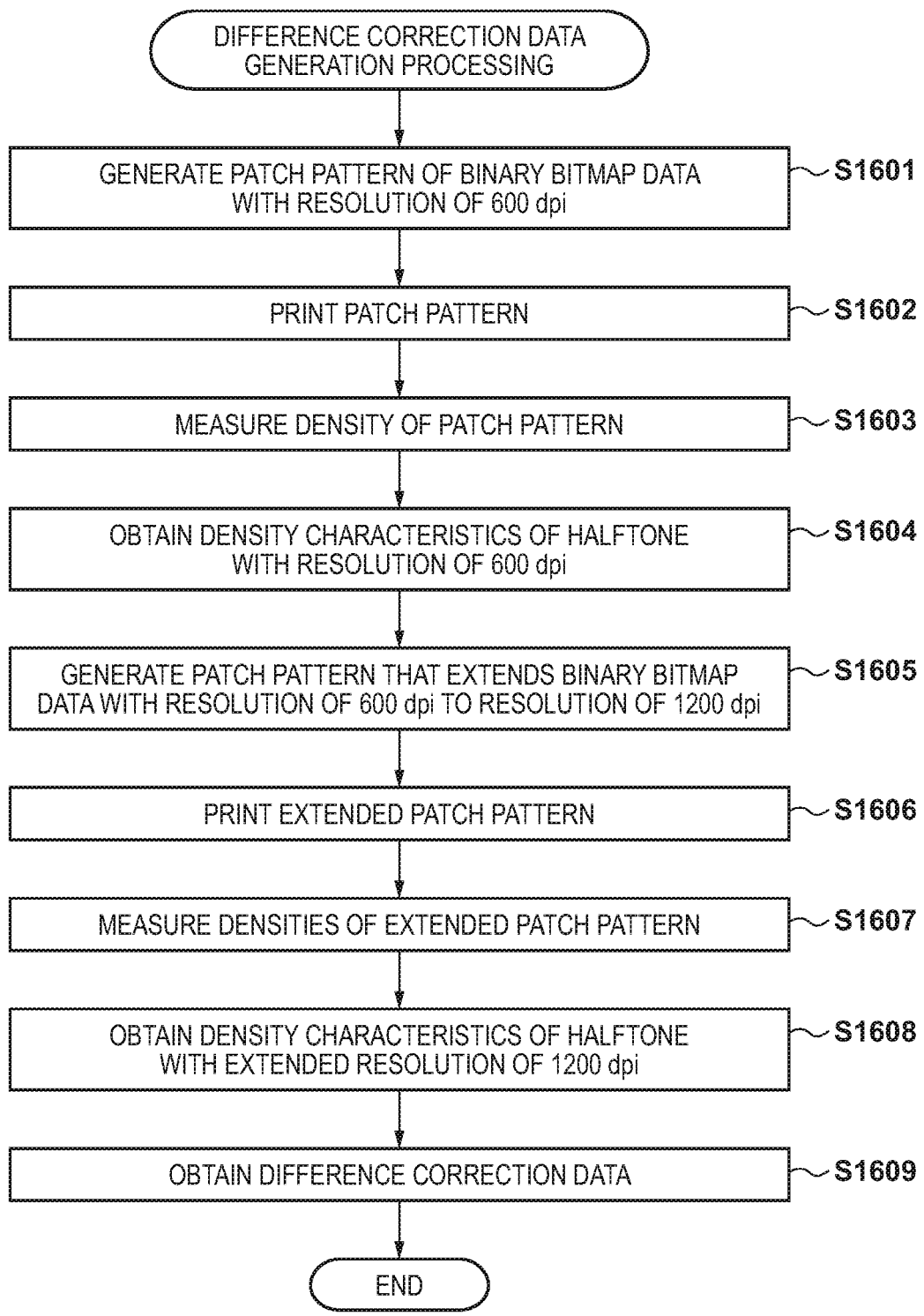
FIG. 16 is a flowchart for describing processing for generating difference correction data that is performed by the density adjustment processing unit according to the first embodiment.

FIG. 16 is a flowchart for describing processing for generating difference correction data that is performed by the density adjustment processing unit 210 according to the first embodiment. Note that processing illustrated in this flowchart will be described as being achieved by the CPU 201 executing a program deployed in the RAM 202.

Figure 17A:
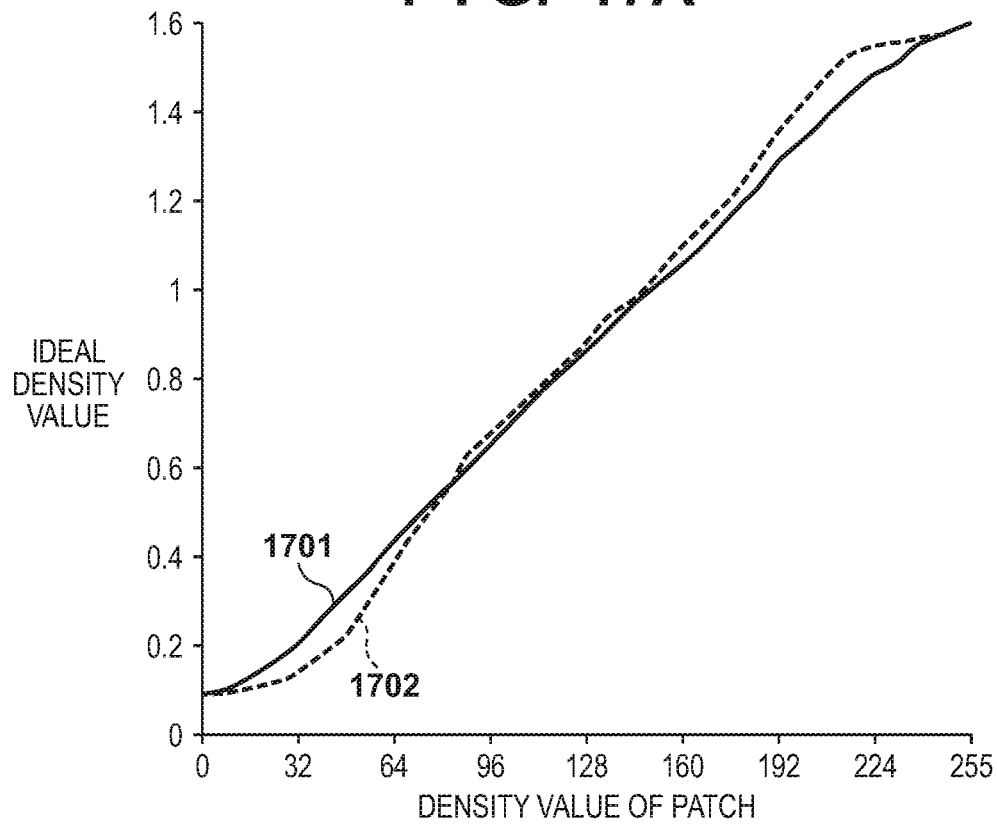
FIGS. 17A and 17B are diagrams respectively showing an example of density characteristics for obtaining difference correction data and an example of difference correction data.
Figure 17B:
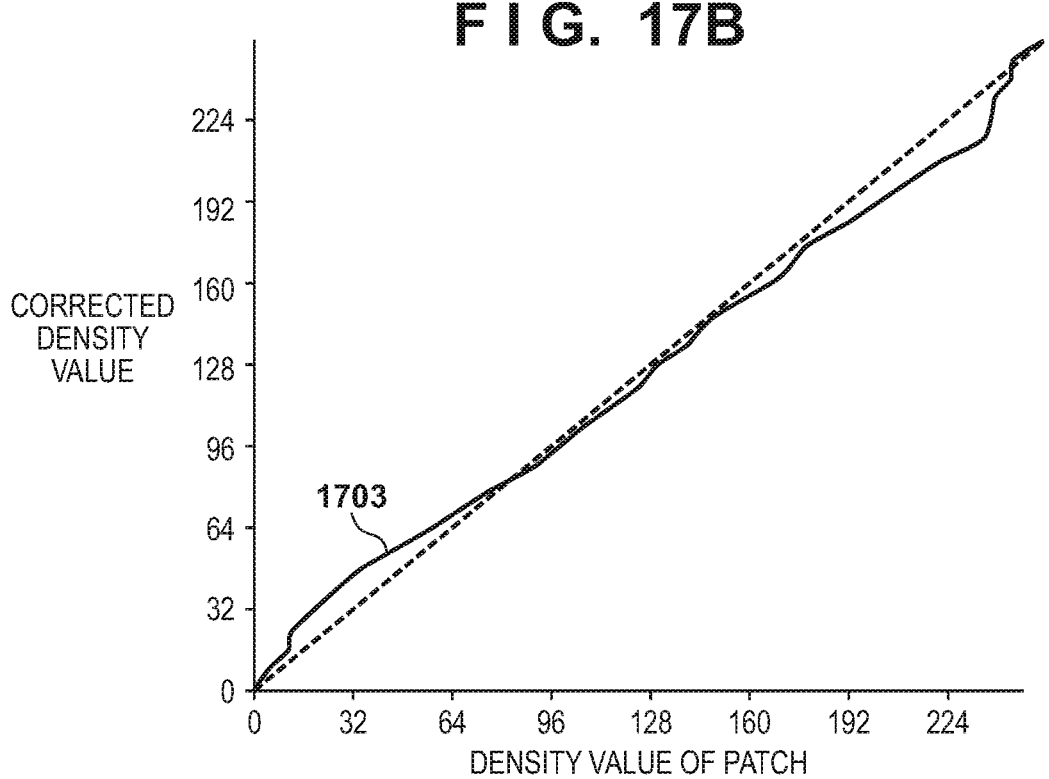

FIGS. 17A and 17B are diagrams respectively showing an example of density characteristics and an example of difference correction data.

First, in step S1601, the CPU 201 generates a patch pattern with a resolution of 600 dpi. Here, first, a plurality of halftone patterns (patches) in which the density of 0 (white) to 255 (solid black) of an input pixel value is divided by density 32 with a difference of density 8, as shown in the patch pattern 603 in FIG. 6, are obtained. Such halftone pattern (patch) is multi-value bitmap data with a resolution of 600 dpi and whose each pixel is represented by eight bits. Next, by performing halftone processing of a resolution of 600 dpi on this multi-value bitmap data, a patch pattern with a resolution of 600 dpi that has undergone conversion into binary bitmap data is generated.

Next, the procedure advances to step S1602, where the CPU 201 causes the printer 104, which is set to a resolution of 600 dpi, to print the patch pattern of the generated binary bitmap data with a resolution of 600 dpi. Subsequently, in step S1603, the CPU 201 causes the scanner 105 to read the printed patch pattern, and measures the density of the patch. The procedure then advances to step S1604, where the CPU 201 obtains, from the measured density values, density characteristics 1701 (the solid line in FIG. 17A) for input density for halftone processing of a resolution of 600 dpi.

Next, the procedure advances to step S1605, where the CPU 201 generates a patch pattern obtained by extending the binary bitmap data obtained through halftone processing of a resolution of 600 dpi, to binary bitmap data with a resolution 1200 dpi. This extended patch pattern is bitmap data obtained by simply dividing each dot in a patch pattern with a resolution of 600 dpi generated in step S1601 by two longitudinally and latitudinally so as to be extended to a resolution 1200 dpi. Next, the procedure advances to step S1606, where the CPU 201 causes the printer 104 set to a resolution 1200 dpi to print the extended patch pattern with a resolution of 1200 dpi that has been generated. The procedure then advances to step S1607, where the CPU 201 causes the scanner 105 to read the printed patch pattern with a resolution of 1200 dpi, and measures the densities of the patch. The procedure then advances to step S1608, where the CPU 201 obtains, from the measured density values, density characteristics 1702 (the broken line in FIG. 17A) for the input density when bitmap data that has undergone halftone processing of a resolution of 600 dpi is extended to a resolution 1200 dpi. The procedure then advances to step S1609, where the CPU 201 obtains difference correction data from the difference between the density characteristics 1701 with a resolution of 600 dpi obtained in step S1605 and density characteristics 1702 extended to a resolution 1200 dpi and obtained in step S1608.

FIGS. 17A and 17B are diagrams respectively showing an example of density characteristics for obtaining difference correction data and an example of the difference correction data.

Here, a difference correction table (the solid line in FIG. 17B) for correcting input density of a patch pattern having characteristics extended such that the density characteristics 1702 extended to a resolution of 1200 dpi match the density characteristics 1701 with a resolution of 600 dpi, and that is denoted by reference numeral 1703. This density correction table can be generated using a method similar to the above-described method of step S706 (FIG. 7) by the density adjustment processing unit 210.

Figure 18:
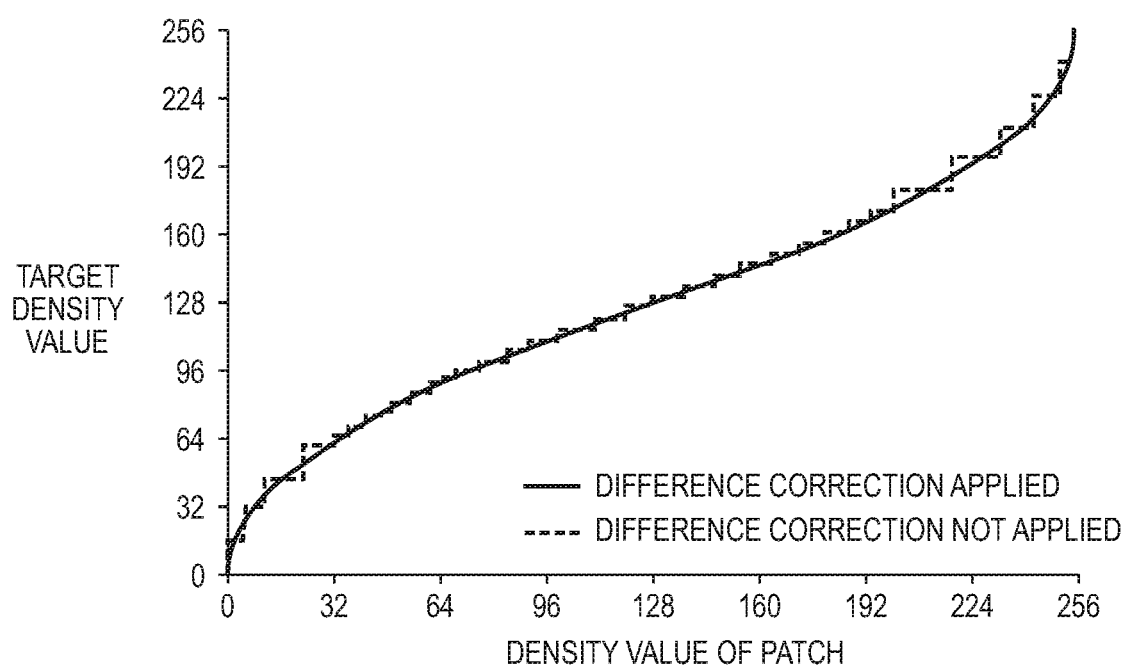
FIG. 18 is a diagram showing the relationship between density values of an extended patch pattern and density values measured from the extended patch pattern according to whether or not correction was performed using difference correction data, in the first embodiment.

FIG. 18 is a diagram showing the relationship between the density values of an extended patch pattern and density values obtained by measuring it, with respect to whether or not correction using difference correction data has been performed, in the first embodiment. In FIG. 18, the solid line indicates a case where correction using difference correction data has been performed, and the dotted line indicates a case where correction using difference correction data has not been performed.

The solid line indicates characteristics (solid line) of a density correction table that is generated by correcting a patch pattern using difference correction data (step S1102), in the extended patch pattern generation processing (FIG. 11). In addition, the dotted line indicates exemplary characteristics of a density correction table that is generated without correcting a patch pattern.

It can be seen that gradation is smooth regarding the density correction table whose characteristics are indicated by the solid line in FIG. 18, compared with the density correction table having characteristics indicated by the dotted line.

As described above, by correcting the density of a patch pattern using the difference correction table, the density characteristics of a patch pattern extended to a resolution of 1200 dpi can be corrected to density characteristics of a resolution of 600 dpi. Accordingly, it is possible to reduce occurrence of gradation crush in a highlighted portion and a shadowed portion, and it is possible to realize improvement in gradation using the density correction table.

As described above, according to the first embodiment, by combining patch patterns with different output resolutions within the same test chart, density correction tables required for respective output resolutions can be generated from one test chart. Accordingly, it is possible to simplify the procedure of density adjustment.

In addition, difference correction data of density characteristics due to different output resolutions is applied to the patch pattern of a test chart, and a density correction table for correcting density change is generated using a patch pattern corrected to the density characteristics of a target output resolution. Accordingly, even if the density characteristics change due to an environment or temporal change, it is possible to prevent decrease in the accuracy of density correction.

Second Embodiment

In the above first embodiment, in density adjustment processing, difference correction data is applied to an extended patch pattern of a test chart. On the other hand, in a second embodiment, a method for applying difference correction data to calculated density characteristics and thereby calculating a density correction table will be described. Note that the configurations of an image processing system, a PC 100, and an image processing apparatus 101 according to the second embodiment are similar to those of the above first embodiment, and thus a description thereof is omitted.

Figure 19:
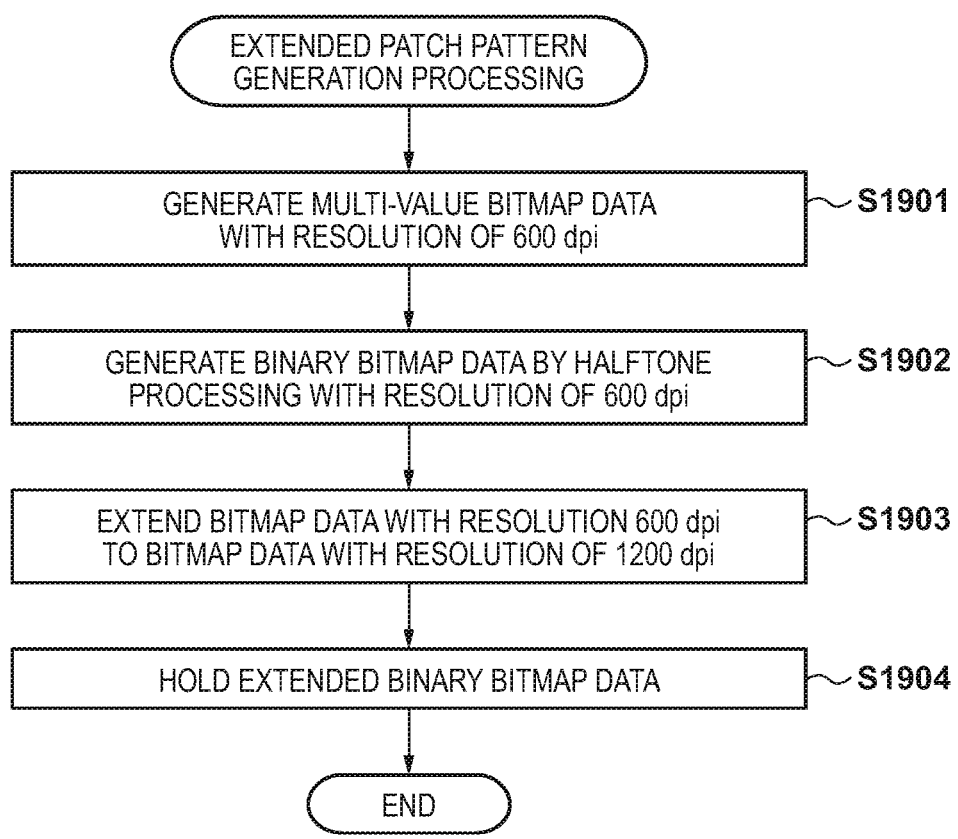
FIG. 19 is a flowchart for describing processing for generating a patch pattern with a resolution of 1200 dpi that is performed by a density adjustment processing unit according to a second embodiment.

FIG. 19 is a flowchart for describing processing for generating a patch pattern with a resolution of 1200 dpi that is performed by a density adjustment processing unit 210 according to the second embodiment. Note that processing illustrated in this flowchart will be described as being achieved by a CPU 201 executing a program deployed in a RAM 202.

First, in step S1901, the CPU 201 generates a halftone pattern (patch) in which the density 0 (white) to 255 (solid black) of a pixel value is divided by 32 with a difference of density of 8, and that is represented as the patch pattern 603 of FIG. 6. This halftone pattern (patch) is contone (multi-value) bitmap data with an output resolution of 600 dpi and whose each pixel is represented by eight bits. Next, the procedure advances to step S1902, where the CPU 201 performs halftone processing of a resolution of 600 dpi on the multi-value bitmap data with a resolution of 600 dpi generated in step S1901, and generates binary bitmap data with a resolution of 600 dpi. Next, the procedure advances to step S1903, where the CPU 201 extends the binary bitmap data with a resolution of 600 dpi generated in step S1902 to binary bitmap data with a resolution 1200 dpi. The procedure then advances to step S1904, where the CPU 201 holds, in the RAM 202, the patch pattern of the binary bitmap data extended to a resolution 1200 dpi, and ends this processing.

FIG. 20 is a flowchart for describing processing for generating a density correction table that is performed by the density adjustment processing unit 210 according to the second embodiment. Note that processing illustrated in this flowchart will be described as being achieved by the CPU 201 executing a program deployed in the RAM 202.

First, in step S2001, the CPU 201 generates a test chart 1501 in which the patch pattern generated in the processing in FIG. 19 is rendered in the patch pattern area 1503 in FIG. 15. Next, the procedure advances to step S2002, where the CPU 201 causes a printer 104 to print the generated test chart. Next, the procedure advances to step S2003, where the CPU 201 causes a scanner 105 to read the printed test chart, and measures the densities of the density patterns of the patch pattern area 1503. Subsequently, in step S2004, the CPU 201 obtains the measured density values. The procedure then advances to step S2005, where the CPU 201 obtains density characteristics for input density, from the measured density values of the obtained the density patterns.

Figure 21A:
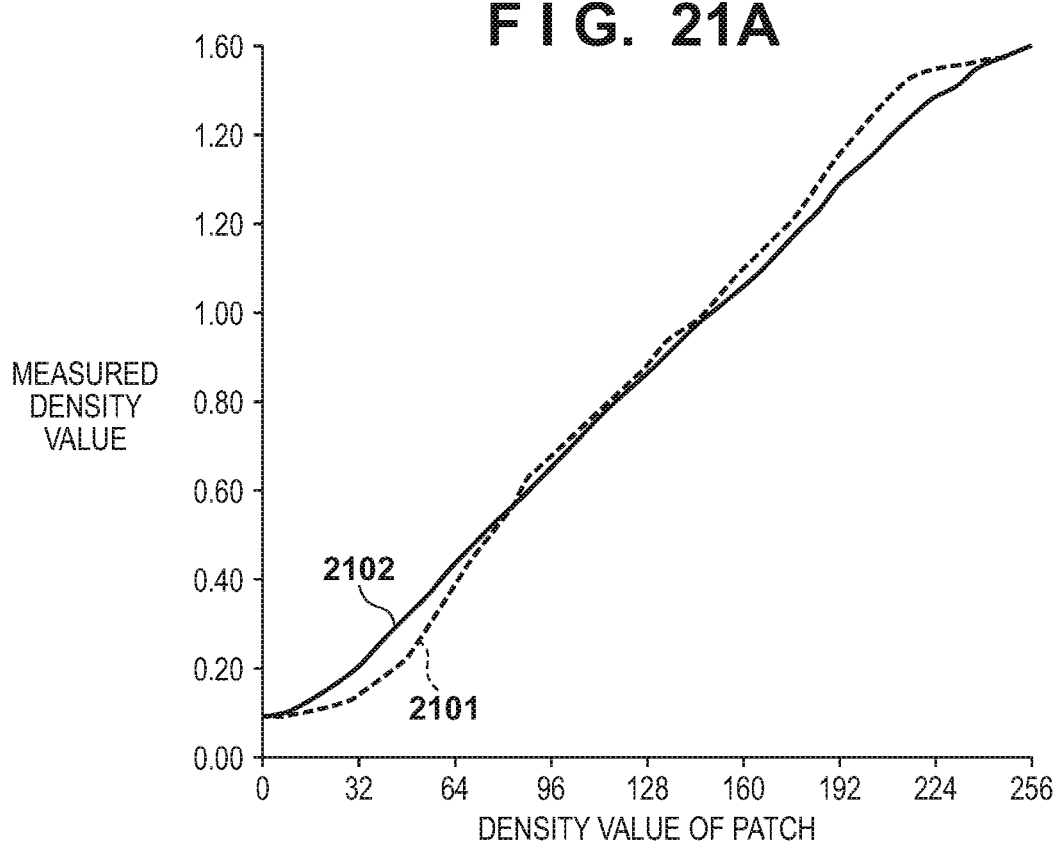
FIGS. 21A and 21B are diagrams showing an example of difference correction data according to the second embodiment.

FIG. 21A shows an example of the obtained density characteristics as density characteristics 2101 (the broken line).

Next, the procedure advances to step S2006, where the CPU 201 corrects the obtained density characteristics 2101 using difference correction data 1703 (FIG. 17B) calculated in the flowchart in FIG. 16. The density characteristics corrected in this manner match density characteristics 2102 (the solid line) in FIG. 21A.

Figure 21B:
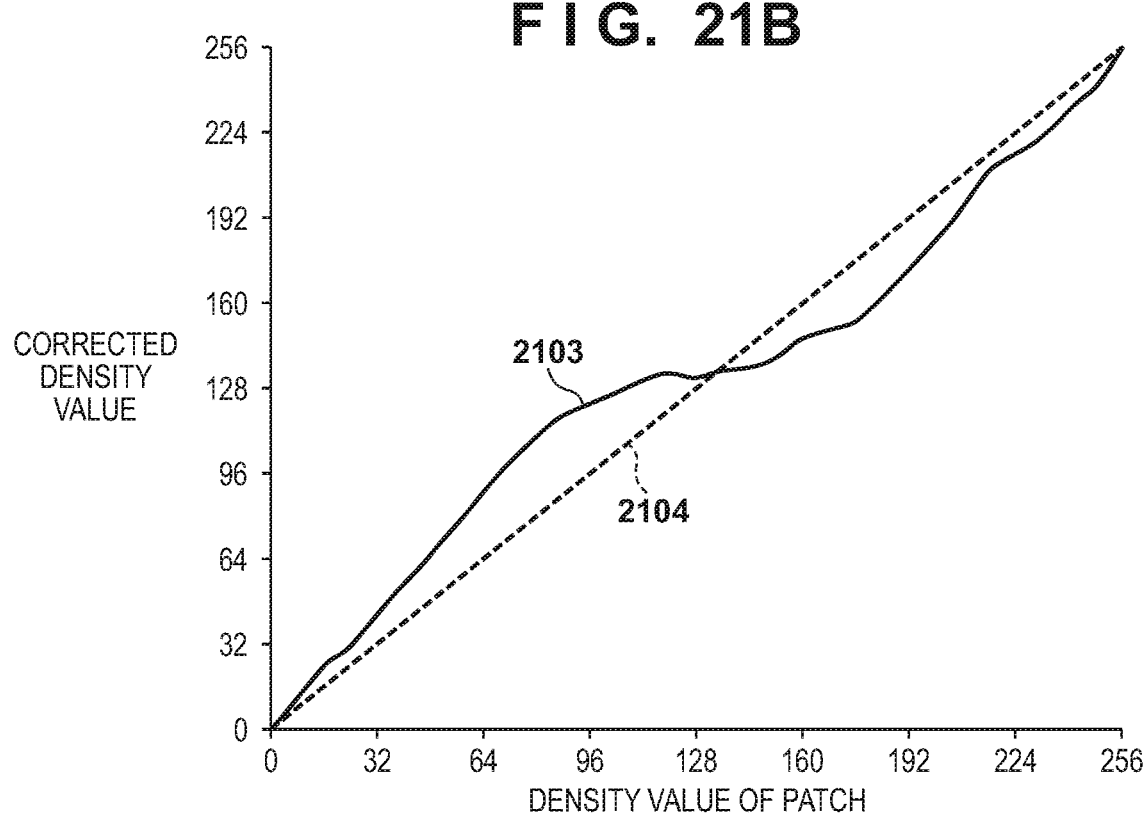

Next, the procedure advances to step S2007, where the CPU 201 generates a one-dimensional density correction table in which the density values are replaced with the density values of density characteristics that indicate target density values, such that the corrected density characteristics 2102 (solid line) match target density characteristics 2104 in FIG. 21B (broken line), and that have characteristics denoted by reference numeral 2103.

As described above, according to the second embodiment, difference correction data of density characteristics due to difference in resolution is applied to the obtained density characteristics, and a density correction table for correcting density change is generated using corrected density characteristics. Accordingly, it is possible to prevent a decrease in accuracy of density correction if density characteristics change due to an environment or temporal change.

In addition, according to the second embodiment, difference data of density characteristics due to difference in resolution is applied to the patch pattern of a test chart, and thereby a density correction table for correcting density change can be generated from a patch pattern corrected to include density characteristics of a target resolution. Accordingly, it is possible to prevent decrease in accuracy of density correction if density characteristics change due to an environment or temporal change.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-010634, filed Jan. 25, 2018, which is hereby incorporated by reference herein in its entirety.

What is claimed is:

1. An image processing apparatus comprising:
a printer;
a memory device that stores a set of instructions; and
one or more processors that execute the instructions stored in the memory to:
cause a scanner to read a first test chart printed by the printer using first pattern data obtained by binarizing multi-value patch pattern data with a first resolution, and measure a density of the first test chart,
convert the first pattern data into second pattern data with a second resolution different from the first resolution,
cause the scanner to read a second test chart printed by the printer using the second pattern data with the second resolution, and measure a density of the second test chart,
obtain difference correction data for correcting differences between the density of the first test chart and the density of the second test chart, correct the density of the multi-value patch pattern data with the first resolution based on the difference correction data, and generate test chart data including a first pattern obtained by converting third pattern data obtained by binarizing the corrected multi-value patch pattern data with the first resolution into fourth pattern data with the second resolution and a second pattern obtained by binarizing multi-value patch pattern data with the second resolution.

2. The image processing apparatus according to claim 1, wherein the multi-value patch pattern data with the first resolution is binarized through first halftone processing corresponding to the first resolution.

3. The image processing apparatus according to claim 2, wherein the multi-value patch pattern data with the second resolution is binarized through second halftone processing corresponding to the second resolution.

4. The image processing apparatus according to claim 3, wherein the one or more processors execute the instructions further to:

measure a density of a first patch pattern that is based on the first pattern of a test chart printed by the printer using the test chart data and a density of a second patch pattern of the test chart that is based on the second pattern, obtain first density characteristics of the first halftone processing from the measured density of the first patch pattern and second density characteristics of the second halftone processing from the measured density of the second patch pattern, and generate a density correction table for correcting the first and second density characteristics.

5. The image processing apparatus according to claim 1, wherein pieces of the multi-value patch pattern data with the first and second resolutions include a plurality of pieces of pattern data in which densities of white to black are divided by a predetermined amount.

6. A method of controlling an image processing apparatus having a printer, the method comprising:

measuring a density of a first test chart printed by the printer using first pattern data obtained by binarizing multi-value patch pattern data with a first resolution;

converting the first pattern data into second pattern data with a second resolution different from the first resolution;

measuring a density of a second test chart printed by the printer using the second pattern data with the second resolution after conversion;

obtaining difference correction data for correcting differences between the density of the first test chart and the density of the second test chart;

correcting the density of the multi-value patch pattern data with the first resolution based on the difference correction data; and generating test chart data including a first pattern obtained by converting third pattern data obtained by binarizing the corrected multi-value patch pattern data with the first resolution into fourth pattern data with the second resolution and a second pattern obtained by binarizing multi-value patch pattern data with the second resolution.

7. The method according to claim 6, wherein the multi-value patch pattern data with the first resolution is binarized through first halftone processing corresponding to the first resolution.

8. The method according to claim 7, wherein the multi-value patch pattern data with the second resolution is binarized through second halftone processing corresponding to the second resolution.

9. The method according to claim 8, further comprising:

measuring a density of a first patch pattern that is based on the first pattern of a test chart printed by the printer using the test chart data and a density of a second patch pattern of the test chart that is based on the second pattern;

obtaining first density characteristics of the first halftone processing from the measured density of the first patch pattern and second density characteristics of the second halftone processing from the measured density of the second patch pattern, and generating a density correction table for correcting the first and second density characteristics.

10. The method according to claim 6, wherein pieces of the multi-value patch pattern data with the first and second resolutions include a plurality of pieces of pattern data in which densities of white to black are divided by a predetermined amount.

11. A non-transitory computer-readable storage medium storing a program for causing a processor to execute a method of controlling an image processing apparatus having a printer, the method comprising:

measuring a density of a first test chart printed by the printer using first pattern data obtained by binarizing multi-value patch pattern data with a first resolution;

converting the first pattern data into second pattern data with a second resolution different from the first resolution;

measuring a density of a second test chart printed by the printer using the second pattern data with the second resolution;

obtaining difference correction data for correcting differences between the density of the first test chart and the density of the second test chart;

correcting the density of the multi-value patch pattern data with the first resolution based on the difference correction data; and generating test chart data that includes a first pattern obtained by converting third pattern data obtained by binarizing the corrected multi-value patch pattern data with the first resolution into fourth pattern data with the second resolution and a second pattern obtained by binarizing multi-value patch pattern data with the second resolution.

* * * * *